United States Patent
Kure

(10) Patent No.: US 8,654,641 B2
(45) Date of Patent: Feb. 18, 2014

(54) TRANSMITTING APPARATUS, TRANSMITTING METHOD, AND PROGRAM

(75) Inventor: Yoshinobu Kure, Kanagawa (JP)

(73) Assignee: Sony Corporation, Tokyo (JP)

( * ) Notice: Subject to any disclaimer, the term of this patent is extended or adjusted under 35 U.S.C. 154(b) by 126 days.

(21) Appl. No.: 13/333,676

(22) Filed: Dec. 21, 2011

(65) Prior Publication Data

US 2012/0163172 A1    Jun. 28, 2012

(30) Foreign Application Priority Data

Dec. 28, 2010    (JP) ................ P2010-292618

(51) Int. Cl.
*H04W 4/00*    (2009.01)

(52) U.S. Cl.
USPC ........................................... 370/232

(58) Field of Classification Search
None
See application file for complete search history.

(56) References Cited

U.S. PATENT DOCUMENTS

| 2003/0231589 | A1* | 12/2003 | Itoh et al. ............... 370/230 |
| 2007/0111801 | A1* | 5/2007 | Haber et al. .............. 463/43 |
| 2007/0269122 | A1 | 11/2007 | Fukuhara et al. |

FOREIGN PATENT DOCUMENTS

JP    2007-311924    11/2007

OTHER PUBLICATIONS

"Buffer Constraints in a Variable-Rate Packetized Video System", Balakrishnan et al., 1995.*

* cited by examiner

*Primary Examiner* — John Blanton
(74) *Attorney, Agent, or Firm* — Sony Corporation

(57) ABSTRACT

A transmitting apparatus includes a rate adjusting unit, a changing unit, a buffer control unit, and a transmitting unit. The rate adjusting unit adjusts a transmission rate of transmitting data. The changing unit changes a size of a buffer for temporarily storing the data, on the basis of the transmission rate. The buffer control unit configured to cause the buffer to temporarily store the data, which is smaller than or equal to an addable size that is smaller than the size of the buffer, and to output the data to the transmitting unit. The transmitting unit transmits the data output from the buffer.

17 Claims, 19 Drawing Sheets

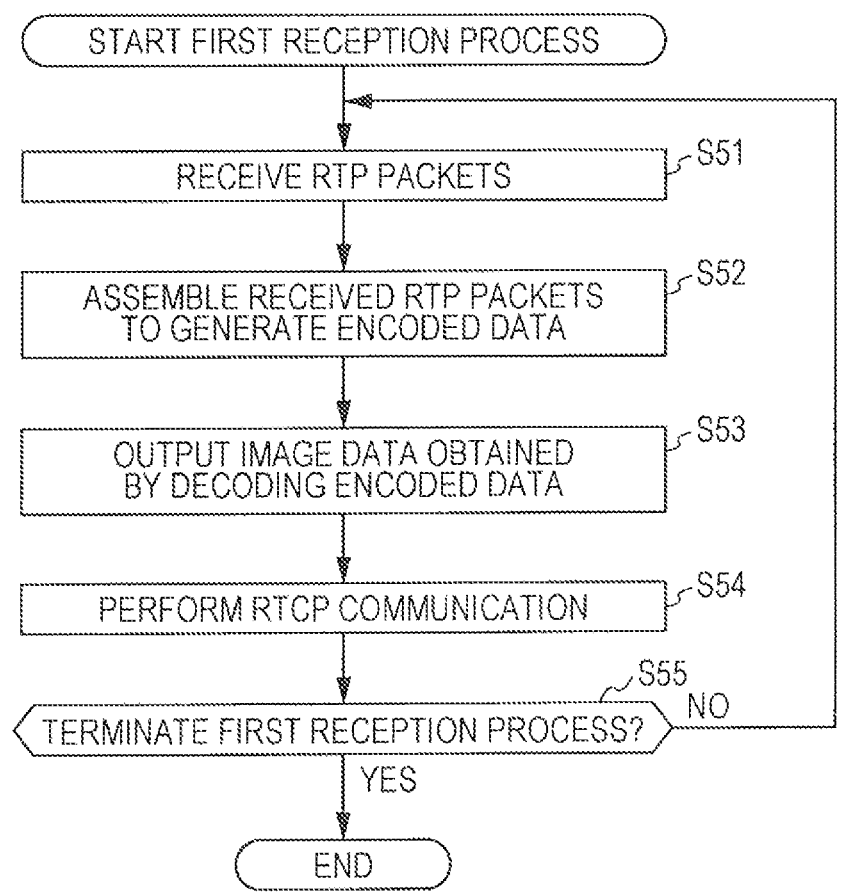

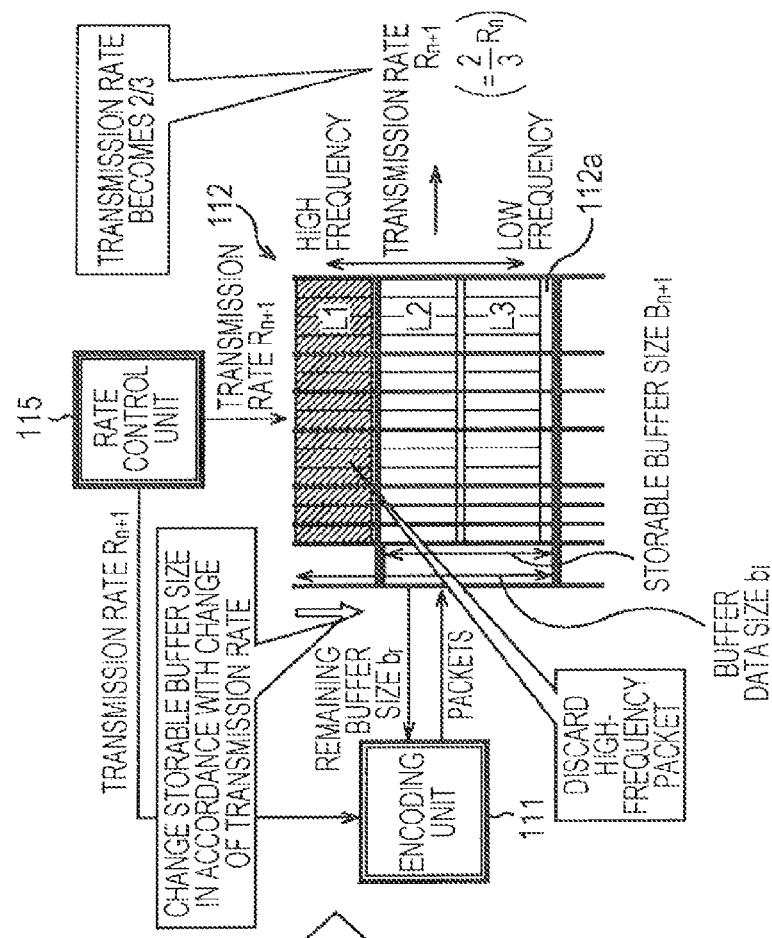
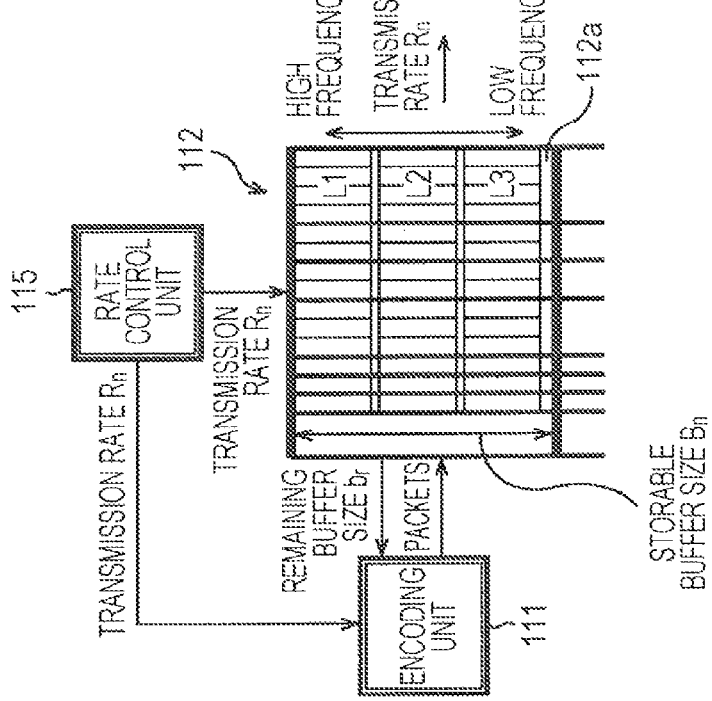
FIG. 7A
FIG. 7B

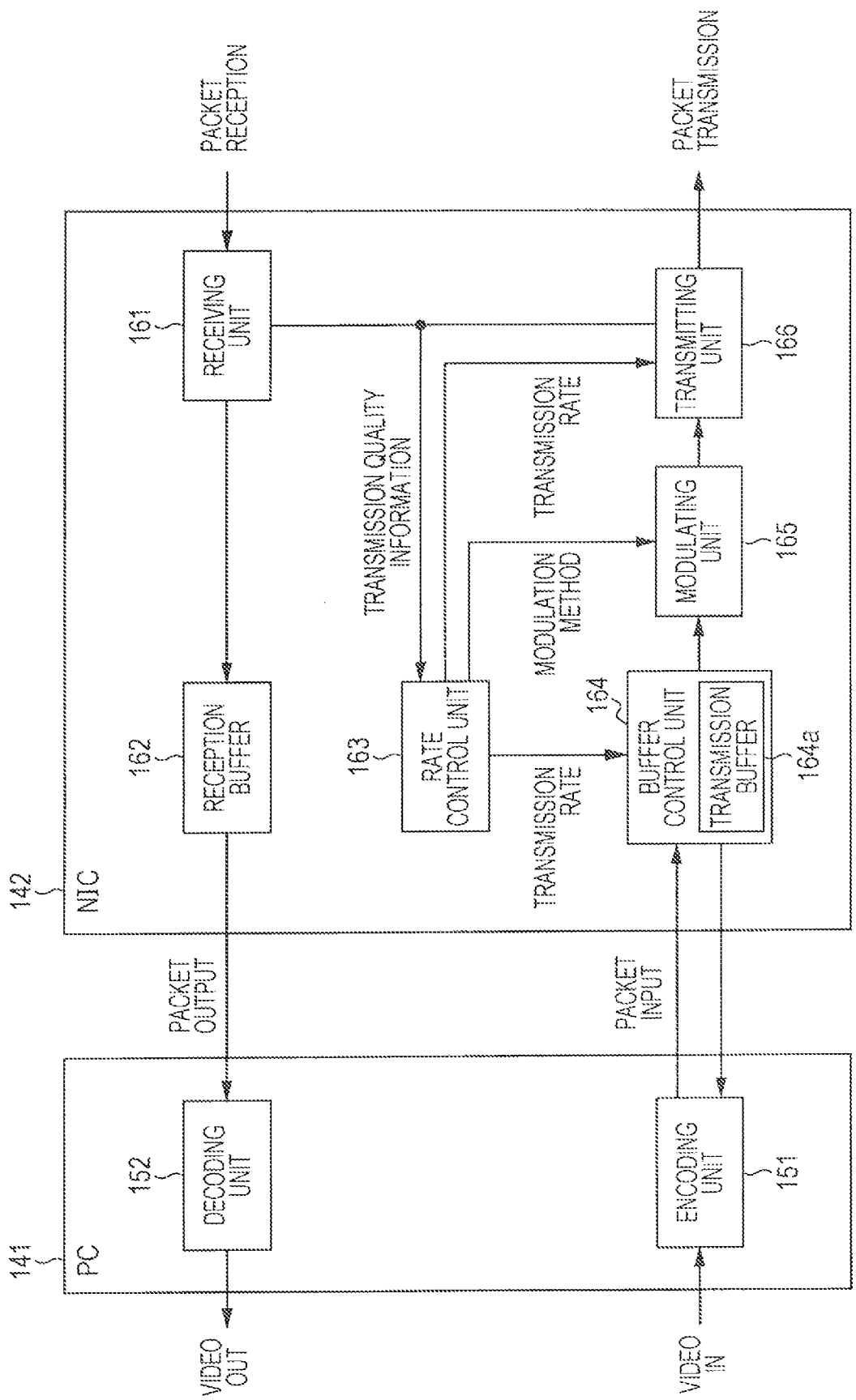

TRANSMITTING APPARATUS, TRANSMITTING METHOD, AND PROGRAM

BACKGROUND

The present disclosure relates to transmitting apparatuses, transmitting methods, and programs and, more particularly, to a transmitting apparatus, a transmitting method, and a program that enable data to be transmitted with low delay regardless of a state of a data channel, e.g., a network.

In recent years, for example, remote surgery has been carried out in which a surgeon performs surgery on a patient by operating robotic arms from a remote location. In this remote surgery, since the surgeon operates the robotic arms while watching moving images obtained by capturing images of the surgery, the moving images are desirably transmitted with a low delay of several frames or less (substantially in real time).

In order to transmit (send) moving images or the like with a low delay of several frames or less via a data channel, such as the Internet, there has been proposed a coding technique for performing wavelet transform coding (compression) on each block of several lines of each picture that constitutes the moving images (see, for example, Japanese Unexamined Patent Application Publication No. 2007-311924).

With this coding technique, a transmitting apparatus can start encoding without waiting for input of the entire data of a picture and transmit the resulting encoded data. Also, a receiving apparatus can start decoding (decompression) before receiving the entire encoded data from the transmitting apparatus.

Accordingly, when congestion (traffic jam) is not caused in a network, delay due to the network congestion does not occur. As a result, the transmission time of the encoded data (time for the encoded data to reach the receiving apparatus from the transmitting apparatus via the network) becomes sufficiently short and, thus, the transmitting apparatus can transmit moving images with low delay.

However, when congestion is caused in the network, delay due to the network congestion occurs. As a result, the transmission time of the encoded data increases and, thus, the transmitting apparatus can no longer transmit moving images with low delay.

Accordingly, there is a rate control process for adjusting a transmission rate, which represents the amount of encoded data transmitted per unit time, in accordance with the congestion state of the network in order to sufficiently shorten the transmission time regardless of the congestion state of the network.

In this rate control process, the transmitting apparatus temporarily stores the encoded data in a transmission buffer thereof, thereby transmitting the encoded data to the receiving apparatus at the transmission rate adjusted by the rate control process.

SUMMARY

When a transmission rate is higher than a data generation rate that represents the amount of encoded data generated per unit time in a transmitting apparatus, the amount of encoded data that is output and transmitted from a transmission buffer is larger than the amount of encoded data that is generated and stored in the transmission buffer.

In this case, since the time the encoded data stays in the transmission buffer is sufficiently short, moving images can be transmitted with low delay.

However, when the transmission rate is lower than the data generation rate of the encoded data in the transmitting apparatus, the amount of encoded data that is generated and stored in the transmission buffer is larger than the amount of encoded data that is output and transmitted from the transmission buffer.

In this case, since the time the encoded data stays in the transmission buffer increases, moving images may no longer be transmitted with low delay.

As described above, delay due to network congestion can be avoided by adjusting the transmission rate in accordance with the network congestion but, depending on the transmission rate, moving images may no longer be transmitted with low delay.

It is desirable to transmit data with low delay regardless of a state of a data channel, such as a network.

A transmitting apparatus according to one embodiment of the present disclosure is a transmitting apparatus including a rate adjusting unit configured to adjust a transmission rate of transmitting data, a changing unit configured to change a size of a buffer for temporarily storing the data, on the basis of the transmission rate, a transmitting unit configured to transmit the data output from the buffer, and a buffer control unit configured to cause the buffer to temporarily store the data, which is smaller than or equal to an addable size that is smaller than the size of the buffer, and to output the data to the transmitting unit.

The changing unit may change the size of the buffer also on the basis of a predetermined transmission buffer time. The buffer control unit may cause the buffer to output the data to the transmitting unit within the transmission buffer time from when the data was stored in the buffer.

The rate adjusting unit may adjust the transmission rate so that a rate adjustment ratio of an adjusted transmission rate to an original transmission rate becomes larger than or equal to a predetermined lower limit.

The rate adjusting unit may restrict the transmission rate from being newly adjusted until a predetermined restriction time passes from when the transmission rate was adjusted.

The rate adjusting unit may restrict the transmission rate from being newly adjusted until the predetermined restriction time passes. The predetermined restriction time indicates a maximum time from when the transmission rate was adjusted to when the size of the data stored in the buffer becomes smaller than or equal to the addable size.

The transmitting apparatus may further include a parameter adjusting unit configured to adjust an encoding parameter used in generation of encoded data obtained by encoding the data, on the basis of the transmission rate, and an encoding unit configured to perform encoding processing based on the encoding parameter on the data. The buffer control unit may cause the buffer to temporarily store the encoded data that is smaller than or equal to the addable size and to output the encoded data to the transmitting unit.

The parameter adjusting unit may adjust a data generation rate serving as the encoding parameter on the basis of the transmission rate. The data generation rate represents an amount of encoded data, generated over a predetermined time.

The rate adjusting unit may adjust the transmission rate on the basis of transmission quality information that represents a state of a data channel for use in transmission of the data.

The rate adjusting unit may adjust the transmission rate on the basis of the transmission quality information that includes at least one of a loss rate, round trip time, jitter, signal-to-noise ratio, and bit error rate of the data.

A transmitting method according to another embodiment of the present disclosure is a transmitting method for a transmitting apparatus that transmits data. The transmitting method includes adjusting a transmission rate of transmitting data, changing a size of a buffer for temporarily storing the data, on the basis of the transmission rate, causing the buffer to temporarily store the data, which is smaller than or equal to an addable size that is smaller than the size of the buffer, and to output the data, and transmitting the data output from the buffer.

A program according to still another embodiment of the present disclosure is a program causing a computer to function as a rate adjusting unit configured to adjust a transmission rate of transmitting data, a changing unit configured to change a size of a buffer for temporarily storing the data, on the basis of the transmission rate, a transmitting unit configured to transmit the data output from the buffer, and a buffer control unit configured to cause the buffer to temporarily store the data, which is smaller than or equal to an addable size that is smaller than the size of the buffer, and to output the data to the transmitting unit.

According to the embodiments of the present disclosure, a transmission rate of transmitting data is adjusted. A size of a buffer for temporarily storing the data is changed on the basis of the transmission rate. The data that is smaller than or equal to an addable size that is smaller than the size of the buffer is temporarily stored in the buffer and is output. The output data is transmitted.

According to the embodiments of the present disclosure, data can be transmitted with low delay regardless of a state of a data channel, such as a network. Additionally, according to the embodiments of the present disclosure, data can be transmitted with low delay without discarding data stored in a buffer.

BRIEF DESCRIPTION OF THE DRAWINGS

FIG. 6 is a flowchart for describing a reception process performed by a receiving apparatus of FIG. 1;

FIGS. 7A and 7B are diagrams illustrating an example in which data in the transmission buffer is discarded in accordance with the priority when the storable buffer size is changed;

FIG. 8 is a block diagram illustrating an example of a configuration of a NIC according to a second embodiment;

DETAILED DESCRIPTION OF EMBODIMENTS

Embodiments for carrying out the present disclosure (hereinafter, referred to as embodiments) will be described below. The description will be given in the following order.
1. First embodiment (an example of performing low-delay data transmission by adjusting a storable buffer size of a transmission buffer)
2. Second embodiment (an example of performing low-delay data transmission using a NIC)
3. Third embodiment (an example of performing low-delay data transmission in a wireless relay apparatus)
4. Fourth embodiment (an example of performing low-delay data transmission without discarding data stored in a transmission buffer)

1. First Embodiment

Example of Configuration of Transmitting/Receiving System 100

Figure 1:
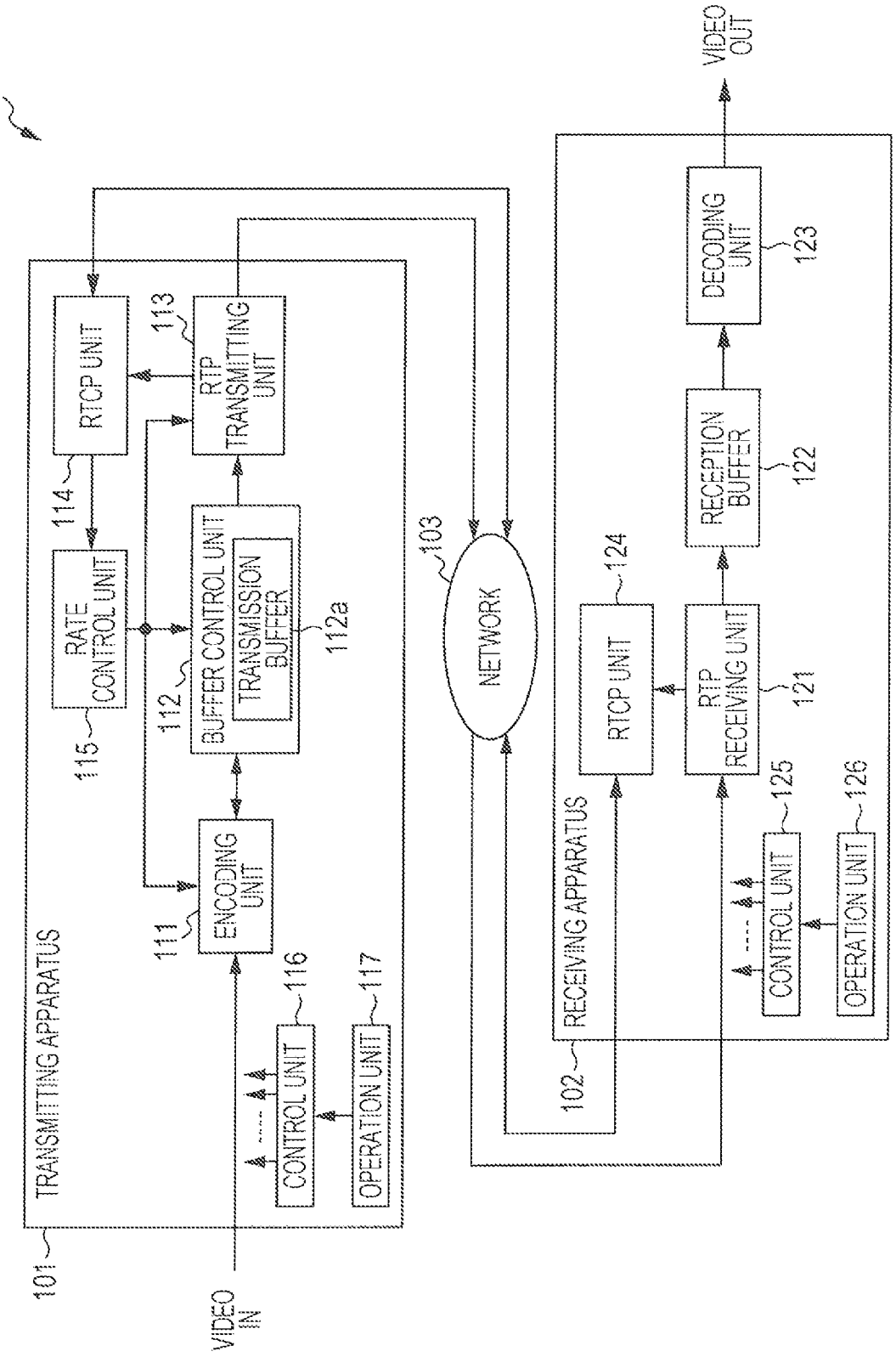
FIG. 1 is a block diagram illustrating an example of a configuration of a first transmitting/receiving system according to a first embodiment.

FIG. 1 illustrates a transmitting/receiving system 100 according to a first embodiment.

This transmitting/receiving system 100 includes a transmitting apparatus 101, a receiving apparatus 102, and a network 103, such as the Internet.

This transmitting/receiving system 100 controls a transmission buffer time of a transmission buffer 112a described later so that a certain time T (hereinafter, also referred to as a transmission buffer time T) is maintained regardless of a transmission rate R of the transmitting apparatus 101, thereby enabling data to be transmitted with low delay.

Here, the transmission buffer time T represents a maximum time from when data was stored in the transmission buffer 112a to when the data is output. The transmission buffer time T is determined in advance by a user, a company manufacturing the transmitting apparatus 101, and so forth. The shorter the transmission buffer time T, the lower the delay with which data can be transmitted.

Additionally, in the transmitting/receiving system 100, data transmission from the transmitting apparatus 101 to the receiving apparatus 102 and collection of a network state and so forth are performed using RTP (Real time Transport Protocol)/RTCP (Realtime Transport Control Protocol) recited in IETF (Internet Engineering Task Force) RFC (Request for Comments) 3550, for example.

Although a case of transmitting image data with low delay from the transmitting apparatus 101 to the receiving apparatus 102 will be described below in the first embodiment, the data transmitted with low delay is not limited to image data and may be any data as long as the data is to be transmitted with low delay.

Example of Configuration of Transmitting Apparatus 101

The transmitting apparatus 101 includes an encoding unit 111, a buffer control unit 112 that includes the transmission buffer 112a, an RTP transmitting unit 113, an RTCP unit 114, a rate control unit 115, a control unit 116, and an operation unit 117.

The encoding unit 111 performs encoding processing for encoding image data input from the outside (corresponding to VIDEO IN). As the encoding processing, wavelet coding can be adopted that performs encoding on image data using wavelet transform to compress the image data, for example. This wavelet coding is described in detail in ITU-T (International Telecommunication Union-Telecommunication Standardization Sector) H.264, Japanese Unexamined Patent Application Publication No. 2007-311924, and so forth.

Here, the wavelet transform refers to a process of transforming image data into coefficient data of each spatial frequency component by recursively repeating analysis filtering, which divides the image data into components having high spatial frequencies (high-frequency components) and components having low spatial frequencies (low-frequency components), on the low-frequency components obtained by the division.

Meanwhile, for example, if the encoding unit 111 sets the compression ratio of the coefficient data of the higher-frequency components smaller and sets the compression ratio of the coefficient data of the lower-frequency components larger, the encoding processing that causes less image quality degradation in the image data can be performed.

The encoding unit 111 also packetizes (converts) the encoded data obtained by the encoding processing into a plurality of RTP packets, and outputs the RTP packets to the buffer control unit 112. The RTP packet refers to a packet having a format based on the RTP recited in IETF RFC 3550.

Further, the encoding unit 111 adjusts encoding parameters used in the encoding processing on the basis of a remaining buffer size $b_r$ that represents a size of the remaining transmission buffer 112a capable of storing RTP packets (FIG. 2) and the transmission rate R fed from the rate control unit 115. The encoding unit 111 performs the aforementioned encoding processing using the adjusted encoding parameters.

Here, the encoding parameters include a data compression ratio in the encoding processing and a data generation rate that represents an amount of RTP packets generated per unit time.

The buffer control unit 112 supplies the RTP packets fed from the encoding unit 111 to the transmission buffer 112a to cause the transmission buffer 112a to store the RTP packets and to output the RTP packets on an FIFO (First In First Out) basis.

The buffer control unit 112 also changes a storable buffer size B in accordance with the transmission rate R fed from the rate control unit 115 so that RTP packets are output within the transmission buffer time T from when the RTP packets were stored in the transmission buffer 112a. The storable buffer size B represents a size of the transmission buffer 112a capable of storing data of RTP packets. Since a method for changing the storable buffer size B is a point of the technique disclosed by this disclosure, the method will be described in detail with reference to FIG. 2 and FIGS. 3A and 3B.

Further, the buffer control unit 112 performs smoothed transmission in which RTP packets in the transmission buffer 112a are sent (output) to the RTP transmitting unit 113 at the transmission rate R fed from the rate control unit 115. This allows the RTP transmitting unit 113 to transmit the RTP packets at the transmission rate R adjusted by the rate control unit 115.

As the smoothed transmission, smoothed transmission using, for example, the token bucket behavior or the leaky bucket behavior recited in ITU-T Y.1221 is adoptable.

For example, the transmission buffer 112a performs smoothed transmission in accordance with the control from the buffer control unit 112. More specifically, the transmission buffer 112a functions as a smoothing buffer for performing smoothing and transmission so that the output rate of outputting RTP packets matches the transmission rate R fed from the rate control unit 115.

The transmission buffer 112a stores RTP packets fed from the encoding unit 111 with the storable buffer size B adjusted by the buffer control unit 112, and outputs the RTP packets on an FIFO basis. Meanwhile, it is assumed that the transmission buffer 112a has a sufficiently large storage capacity, which is larger than or equal to the maximum storable buffer size B that can be adjusted.

In accordance with the RTP, the RTP transmitting unit 113 attaches, as timestamp, for example, transmission time at which RTP packets are transmitted to the receiving apparatus 102 to the RTP packets fed from the buffer control unit 112. The RTP transmitting unit 113 then transmits the timestamp-attached RTP packets to the receiving apparatus 102 via the network 103 at the transmission rate R informed from the rate control unit 115.

Since the RTP transmitting unit 113 transmits the timestamp-attached RTP packets, the receiving apparatus 102 can grasp a time relation (e.g., transmission order) of the RTP packets transmitted from the transmitting apparatus 101. Accordingly, the receiving apparatus 102 can correctly reproduce image data in synchronization, without receiving influences of delay variation (jitter) of the RTP packets and so forth.

Here, the RTP does not guarantee real-time transmission of RTP packets. Additionally, the priority, setting, management, and so forth in transmission of RTP packets are not included in the transport service provided by the RTP.

Accordingly, transmission delay, which indicates that an RTP packet will not have reached the receiving apparatus 102 within a predetermined time from transmission of the RTP packet, or packet loss, which indicates that errors have occurred in an RTP packet, may occur for RTP packets.

The receiving apparatus 102 discards RTP packets for which transmission delay or packet loss has occurred. The receiving apparatus 102 performs processing, such as reproduction, on RTP packets for which neither transmission delay nor packet loss has occurred.

Meanwhile, RTP packets experiencing transmission delay or packet loss are discarded in order to realize real-time reproduction of image data (moving images) of RTP packets.

Transmission delay or packet loss of RTP packets is often caused by congestion of the network 103. More specifically, for example, even if the transmitting apparatus 101 transmits RTP packets of high-quality image data, unignorable transmission delay or unignorable packet loss may occur for the RTP packets depending on the degree of congestion of the network 103.

In this case, since many RTP packets are discarded in the receiving apparatus 102 because of occurrence of transmission delay or packet loss for the RTP packets, the receiving apparatus 102 may be incapable of reproducing high-quality image data.

Accordingly, the rate control unit 115 described later adjusts the transmission rate R in accordance with the state (e.g., the degree of congestion) of the network 103, thereby suppressing transmission delay or packet loss caused for RTP packets. This allows the receiving apparatus 102 to reproduce image data while maintaining the quality of the image data transmitted from the transmitting apparatus 101 regardless of the state of the network 103.

The RTP transmitting unit 113 also generates RTP packet transmission information that represents a transmission state of RTP packets on the basis of an RTP packet sending state or the like, and supplies the RTP packet transmission information to the RTCP unit 114.

On the basis of the RTP packet transmission information fed from the RTP transmitting unit 113, the RTCP unit 114 generates transmission quality information that represents a state of a data channel (e.g., the network 103) between the transmitting apparatus 101 and the receiving apparatus 102. The RTCP unit 114 supplies the transmission quality information to the rate control unit 115.

Here, the transmission quality information includes information for determining the state of the data channel.

More specifically, the transmission quality information includes at least one of RTT (Round Trip Time), transmission jitter, a packet loss rate, an S/N ratio (signal-to-noise ratio), and a BER (Bit Error Rate), for example. When transmission is performed via wireless communication, the transmission quality information may include radio field intensity in the wireless communication.

Additionally, the RTCP unit 114 performs communication with an RTCP unit 124 of the receiving apparatus 102 via the network 103 in accordance with the RTCP, collects the transmission quality information in the data channel between the transmitting apparatus 101 and the receiving apparatus 102, and supplies the transmission quality information to the rate control unit 115.

Meanwhile, an RTCP receiver report (RR) packet and an RTCP sender report (SR) packet recited in IETF RFC 3550 are transmitted and received between the RTCP unit 114 and the RTCP unit 124 of the receiving apparatus 102 described later, whereby the transmission quality information is collected.

The rate control unit 115 adjusts the transmission rate R of transmitting RTP packets from the transmitting apparatus 101 on the basis of the transmission quality information fed from the RTCP unit 114, and informs the encoding unit 111, the buffer control unit 112, and the RTP transmitting unit 113 of the adjusted transmission rate R.

Adjustment of the transmission rate R is performed by the rate control unit 115 in accordance with, for example, "TCP Friendly Rate Control (TFRC): Protocol Specification", i.e., so-called TFRC, recited in IETF RFC 3448.

As described above, since the rate control unit 115 adjusts the transmission rate R in accordance with the state of the network 103, delay due to congestion of the network 103 may be avoided.

The control unit 116 controls each of the encoding unit 111, the buffer control unit 112, the RTP transmitting unit 113, the RTCP unit 114, and the rate control unit 115 on the basis of operation signals fed from the operation unit 117, for example.

The operation unit 117 includes operation buttons or the like operated by a user, and supplies the control unit 116 with operation signals corresponding to user operations.

Example of Configuration of Receiving Apparatus 102

The receiving apparatus 102 includes an RTP receiving unit 121, a reception buffer 122, a decoding unit 123, the RTCP unit 124, a control unit 125, and an operation unit 126.

The RTP receiving unit 121 receives RTP packets transmitted from the RTP transmitting unit 113 via the network 103. The RTP receiving unit 121 supplies the RTP packets to the reception buffer 122 for storage. The RTP receiving unit 121 also generates RTP packet transmission information, which represents a transmission state of RTP packets, on the basis of an RTP packet receiving state or the like, and supplies the RTP packet transmission information to the RTCP unit 124.

The reception buffer 122 temporarily stores the RTP packets fed from the RTP receiving unit 121. Meanwhile, it is assumed that the reception buffer 122 has a sufficiently large storage capacity so that overflow is avoided.

The decoding unit 123 reads out the RTP packets from the reception buffer 122 and assembles the read out RTP packets, thereby generating encoded data to be decoded. The decoding unit 123 then performs, on the generated encoded data, decoding processing corresponding to the encoding processing performed in the encoding unit 111. The decoding unit 123 outputs the resulting image data to a monitor or the like, not illustrated.

Here, as the decoding processing, decoding processing for decompressing the encoded data using decoding based on inverse wavelet transform, for example, is adopted.

The RTCP unit 124 generates transmission quality information on the basis of the RTP packet transmission information fed from the RTP receiving unit 121, and transmits the transmission quality information to the RTCP unit 114 of the transmitting apparatus 101 via the network 103.

The control unit 125 controls each of the RTP receiving unit 121, the reception buffer 122, the decoding unit 123, and the RTCP unit 124 on the basis of operation signals fed from the operation unit 126, for example.

The operation unit 126 includes operation buttons or the like operated by a user, and supplies the control unit 125 with operation signals corresponding to user operations.

Method for Adjusting Storable Buffer Size

A process mainly performed by the buffer control unit 112 will be described next with reference to FIG. 2 and FIGS. 3A and 3B.

Figure 2:
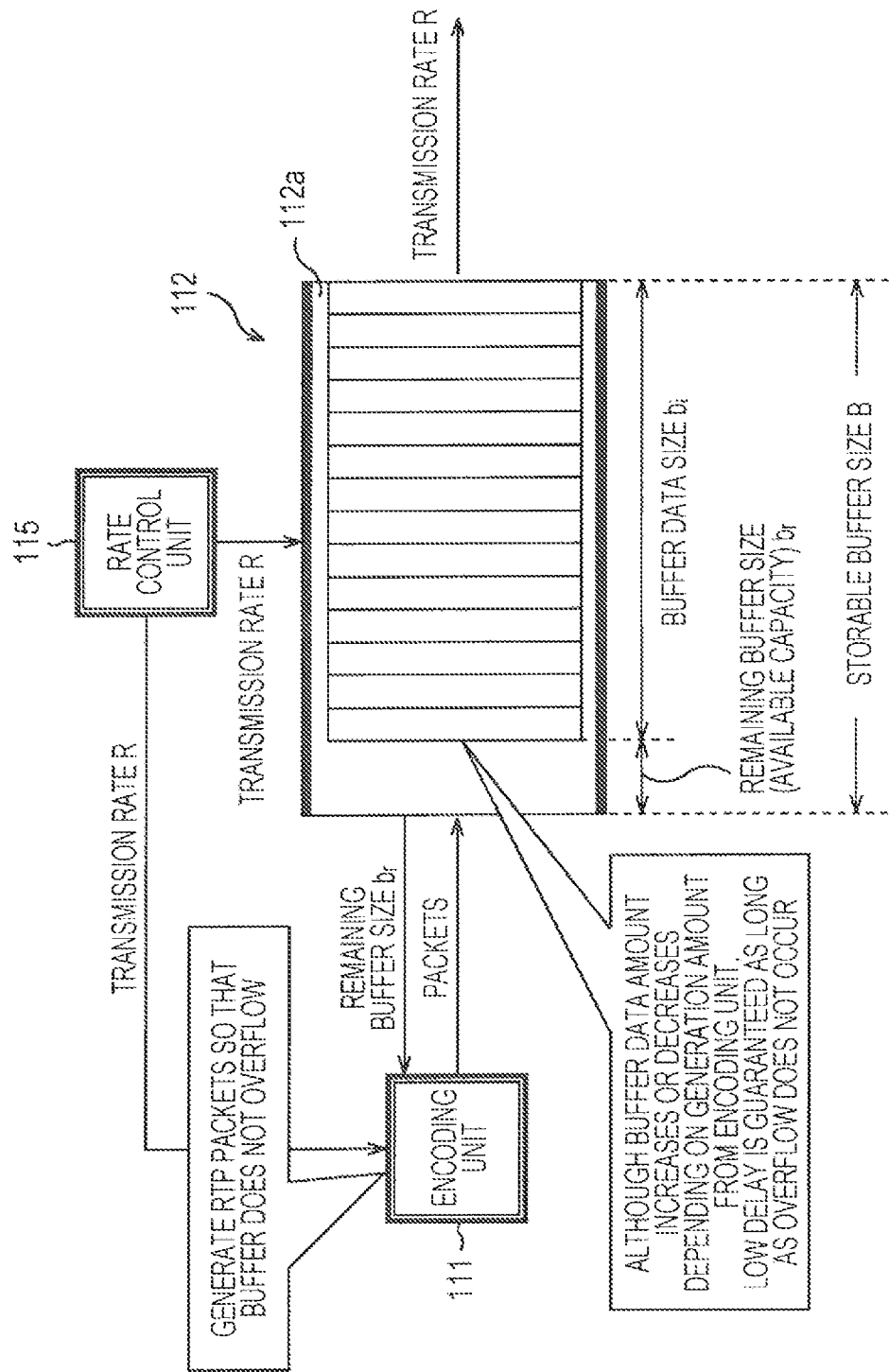
FIG. 2 is a diagram mainly illustrating an example of a process of changing a storable buffer size.

FIG. 2 illustrates an example of a process mainly performed by the buffer control unit 112.

The buffer control unit 112 changes the storable buffer size B on the basis of the transmission rate R fed from the rate control unit 115 and the predetermined transmission buffer time T using Equation (1) below.

$$B \text{ (bit)} = R \text{ (bps)} \times T \text{ (sec)} \tag{1}$$

More specifically, for example, suppose that the current transmission rate R is denoted as $R_n$ and the current storable buffer size B is denoted as $B_n$ ($=R_n \times T$). Upon adjusting the transmission rate $R_n$ to the transmission rate $R_{n+1}$, the rate control unit 115 informs the encoding unit 111, the buffer control unit 112, and the RTP transmitting unit 113 of the transmission rate $R_{n+1}$.

At this time, the buffer control unit 112 calculates the storable buffer size $B_{n+1}$ ($=R_{n+1} \times T$) on the basis of the transmission rate $R_{n+1}$ informed from the rate control unit 115 and the transmission buffer time T using Equation (1). The buffer control unit 112 then changes the storable buffer size $B_n$ of the transmission buffer 112a to the storable buffer size $B_{n+1}$.

Additionally, the encoding unit 111 adjusts encoding parameters, e.g., a data generation rate of RTP packets, on the basis of the transmission rate R fed from the rate control unit 115 and the remaining buffer size $b_r$ fed from the buffer control unit 112, and performs encoding processing using the adjusted data generation rate.

In this way, a buffer data size $b_t$ of the transmission buffer 112a is prevented from exceeding the storable buffer size B because of RTP packets fed from the encoding unit 111. As long as the buffer data size $b_t$ is kept smaller than or equal to the storable buffer size B in the transmission buffer 112a, low-delay data transmission is guaranteed.

Meanwhile, the encoding unit 111 adjusts the data generation rate on the basis of the transmission rate R fed from the rate control unit 115 and the remaining buffer size $b_r$ fed from the buffer control unit 112. However, if the encoding unit 111 is capable of rapidly adjusting the data generation rate in response to adjustment of the transmission rate R by the rate control unit 115, the encoding unit 111 may adjust the data generation rate to the transmission rate R fed from the rate control unit 115, using the transmission rate R fed from the rate control unit 115 alone.

Additionally, although the encoding unit 111 adjusts the data generation rate on the basis of the transmission rate R fed from the rate control unit 115 and the remaining buffer size $b_r$ fed from the buffer control unit 112, the rate control unit 115 may calculate the data generation rate and may inform the encoding unit 111 of the data generation rate.

More specifically, for example, the rate control unit 115 may obtain the remaining buffer size $b_r$ from the buffer control unit 112, may calculate the data generation rate on the basis of the obtained remaining buffer size $b_r$ and the calculated transmission rate R, and may inform the encoding unit 111 of the calculated data generation rate.

Meanwhile, in response to adjustment of the transmission rate $R_n$ to the transmission rate $R_{n+1}$, the storable buffer size $B_n$ may be adjusted to the storable buffer size $B_{n+1}$ that is smaller than the buffer data size $b_i$.

In this case, the buffer data size $b_i$ of the transmission buffer 112a exceeds the storable buffer size $B_{n+1}$ and, thus, low-delay data transmission can no longer be performed.

Accordingly, in the first embodiment, if the buffer data size $b_i$ exceeds the storable buffer size $B_{n+1}$, RTP packets in the transmission buffer 112a are discarded until the buffer data size $b_i$ becomes smaller than or equal to the storable buffer size $B_{n+1}$. In this way, low-delay data transmission is guaranteed.

When the encoding unit 111 performs encoding processing at a fixed data generation rate regardless of the transmission rate R, when the encoding unit 111 fails to rapidly adjust the data generation rate in accordance with the adjusted transmission rate $R_{n+1}$, and so forth, many RTP packets may be output to the transmission buffer 112a from the encoding unit 111.

In this case, the buffer data size $b_i$ of the transmission buffer 112a similarly exceeds the storable buffer size $B_{n+1}$. However, as described above, since the RTP packets in the transmission buffer 112a are discarded until the buffer data size $b_i$ becomes smaller than or equal to the storable buffer size $B_{n+1}$ in the first embodiment, low-delay data transmission is also guaranteed.

Example of Discarding Data in Transmission Buffer 112a

Figure 3:
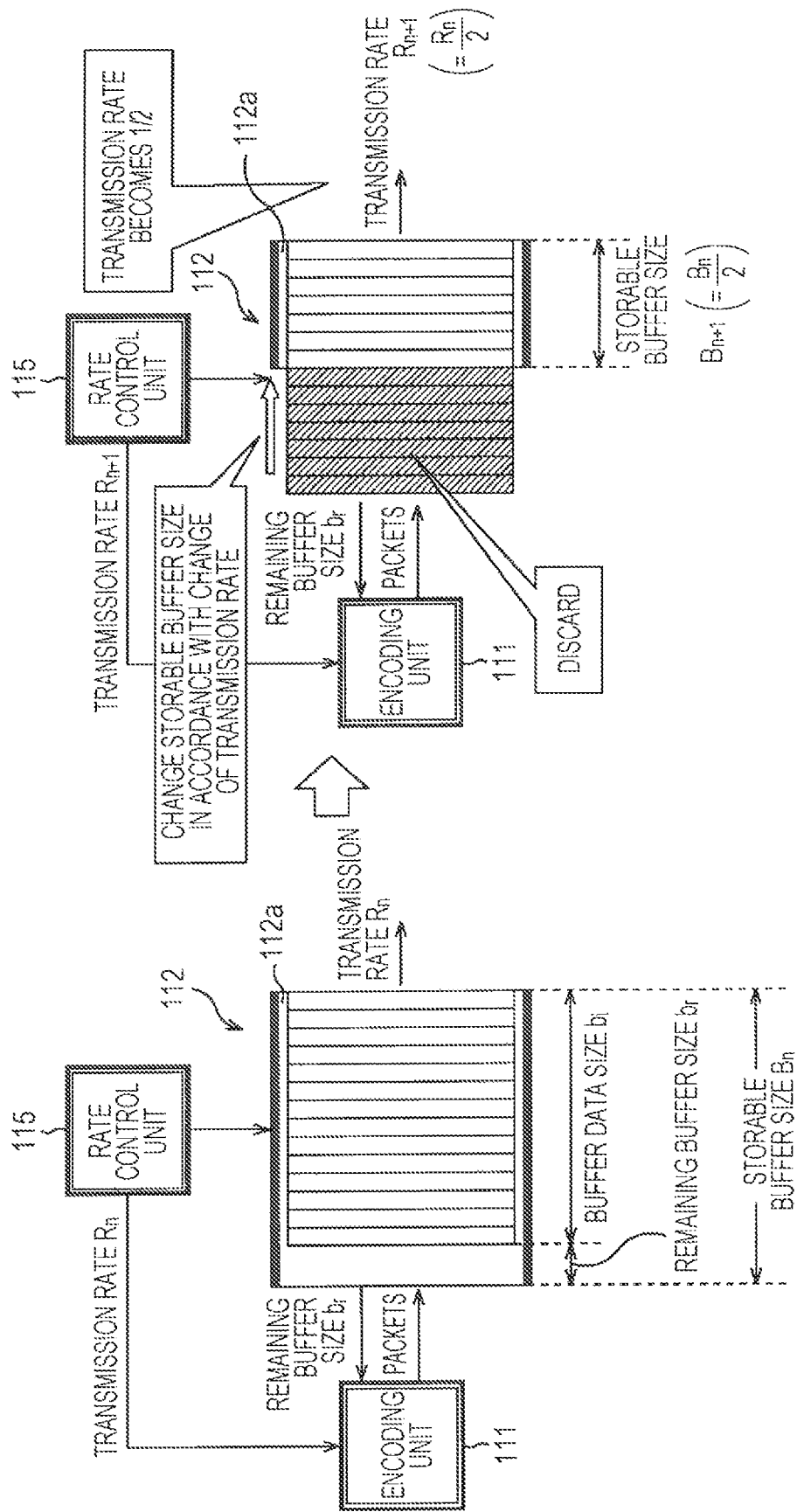
FIGS. 3A and 3B are diagrams mainly illustrating an example in which data in a transmission buffer is discarded when the storable buffer size is changed.

FIGS. 3A and 3B illustrate an example of discarding some of RTP packets stored in the transmission buffer 112a when the storable buffer size $B_n$ is changed to the storable buffer size $B_{n+1}$ that is smaller than the buffer data size $b_i$.

For example, upon being supplied with the transmission rate $R_{n+1}$ ($=R_n/2$) from the rate control unit 115, the buffer control unit 112 changes the current storable buffer size $B_n$ illustrated in FIG. 3A to the storable buffer size $B_{n+1}$ ($=B_n/2$) illustrated in FIG. 3B on the basis of Equation (1).

In this case, the buffer data size $b_i$ of the transmission buffer 112a exceeds the changed storable buffer size $B_{n+1}$. Accordingly, as illustrated in FIG. 3B, the buffer control unit 112 discards some (indicated by a shaded part) of the RTP packets stored in the transmission buffer 112a to adjust the buffer data size $b_i$ so that the buffer data size $b_i$ becomes smaller than or equal to the storable buffer size $B_{n+1}$.

When the RTP packets in the transmission buffer 112a are discarded, given RTP packets may be discarded or the discarding priority may be attached the RTP packets and the RTP packets may be discarded in the descending order of the priority.

More specifically, for example, regarding RTP packets including coefficient data of each frequency component obtained, by wavelet transform, the higher priority may be attached to RTP packets including coefficient data of higher-frequency components and the RTP packets may be discarded. A method for discarding RTP packets in accordance with the priority will be described in detail with reference to FIGS. 7A and 7B.

Description of Operations of Transmitting Apparatus 101

Next, a transmission process (hereinafter, referred to as a first transmission process) performed by the transmitting apparatus 101 will be described with reference to a flowchart of FIG. 4.

In step S1, the encoding unit 111 performs encoding processing on image data fed from the outside at the data generation rate that is calculated on the basis of the transmission rate R fed from the rate control unit 115 and the remaining buffer size $b_r$ fed from the buffer control unit 112.

In step S2, the encoding unit 111 packetizes (converts) the encoded data obtained by the encoding processing into a plurality of RTP packets. The encoding unit 111 then outputs the plurality of RTP packets obtained by the packetization to the buffer control unit 112.

In step S3, the buffer control unit 112 supplies the RTP packets fed from the encoding unit 111 to the transmission buffer 112a thereof for storage. The buffer control unit 112 then outputs the RTP packets from the transmission buffer 112a to the RTP transmitting unit 113 at an output rate that is the same as the transmission rate R informed from the rate control unit 115.

In step S4, the buffer control unit 112 determines whether or not the storable buffer size B of the transmission buffer 112a is larger than or equal to the buffer data size $b_i$.

If the buffer control unit 112 determines in step S4 that the storable buffer size B is not larger than or equal to the buffer data size $b_i$, i.e., that the buffer data size $b_i$ is larger than the storable buffer size B, as illustrated in FIG. 3B, the process proceeds to step S5.

In step S5, the buffer control unit 112 discards the RTP packets stored in the transmission buffer 112a until the buffer data size $b_i$ becomes smaller than or equal to the storable buffer size B. The process then returns to step S1 and the similar processing is performed thereafter.

Meanwhile, in step S5, the discarding priority may be attached to the RTP packets and the RTP packets may be discarded in accordance with the priority. Details of a process of discarding the RTP packets in accordance with the priority will be described later with reference to FIGS. 7A and 7B.

If the buffer control unit 112 determines in step S4 that the storable buffer size B is larger than or equal to the buffer data size $b_i$ as illustrated in FIG. 3A, the process proceeds to step S6.

In step S6, the RTP transmitting unit 113 determines whether or not the RTP packets fed from the buffer control unit 112 are transmittable on the basis of an RTP packet sending state or the like. After it is determined that the packets are transmittable, the process proceeds to step S7.

In step S7, in accordance with the RTP, the RTP transmitting unit 113 transmits the RTP packets fed from the buffer control unit 112 to the receiving apparatus 102 via the network 103 at the transmission rate R fed from the rate control unit 115.

In step S8, in accordance with the RTCP, the RTCP unit 114 performs communication with the RTCP unit 124 of the receiving apparatus 102 via the network 103, collects transmission quality information of a data channel between the transmitting apparatus 101 and the receiving apparatus 102, and supplies the transmission quality information to the rate control unit 115.

In step S9, a first rate control process is performed in which the encoding unit 111 adjusts the data generation rate, the buffer control unit 112 adjusts the storable buffer size B, and the rate control unit 115 adjusts the transmission rate R. Details of this first rate control process will be described later with reference to a flowchart of FIG. 5.

In step S10, the control unit 116 determines whether or not to terminate the first transmission process on the basis of an operation signal fed from the operation unit 117 or the like. If the control unit 116 determines not to terminate the first transmission process, the process returns to step S1 and the similar processing is performed thereafter.

If the control unit 116 determines to terminate the first transmission process in step S10, the first transmission process is terminated.

As described above, since the transmission rate R is adjusted in accordance with a state of the network 103 in the first transmission process, transmission delay or packet loss of RTP packets can be suppressed regardless of the state of the network 103. Accordingly, image quality degradation of image data caused by transmission delay or packet loss of RTP packets can be suppressed.

Additionally, the storable buffer size B is changed in response to adjustment of the transmission rate R in the first transmission process, so that the transmission buffer time of the transmission buffer 112a is maintained at a certain time T. Accordingly, image data can be transmitted with low delay regardless of the state of the network 103.

Details of First Rate Control Process

Next, details of the first rate control process in step S9 of FIG. 4 will be described with reference to a flowchart of FIG. 5.

In step S31, the rate control unit 115 obtains transmission quality information from the RTCP unit 114. In step S32, the rate control unit 115 adjusts the transmission rate R on the basis of the transmission quality information obtained from the RTCP unit 114, and supplies the adjusted transmission rate R to the encoding unit 111, the buffer control unit 112, and the RTP transmitting unit 113.

In step S33, the buffer control unit 112 calculates and changes the storable buffer size B of the transmission buffer 112a thereof on the basis of the transmission rate R fed from the rate control unit 115 and the predetermined transmission buffer time T.

The buffer control unit 112 also supplies the encoding unit 111 with the remaining buffer size $b_r$ obtained by subtracting the buffer data size $b_i$ of the transmission buffer 112a from the calculated storable buffer size B.

Figure 4:
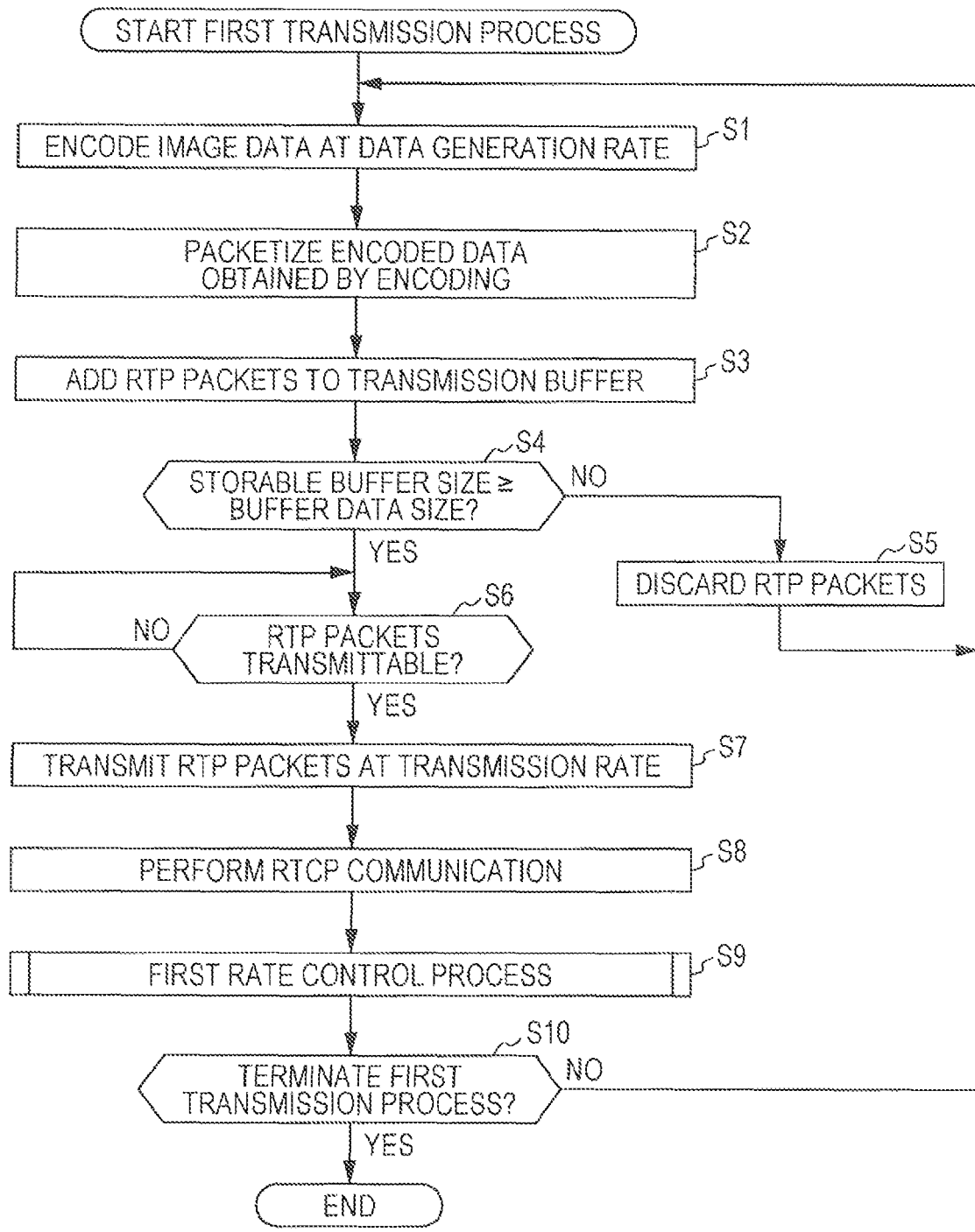
FIG. 4 is a flowchart for describing a transmission process performed by a transmitting apparatus of FIG. 1.
Figure 5:
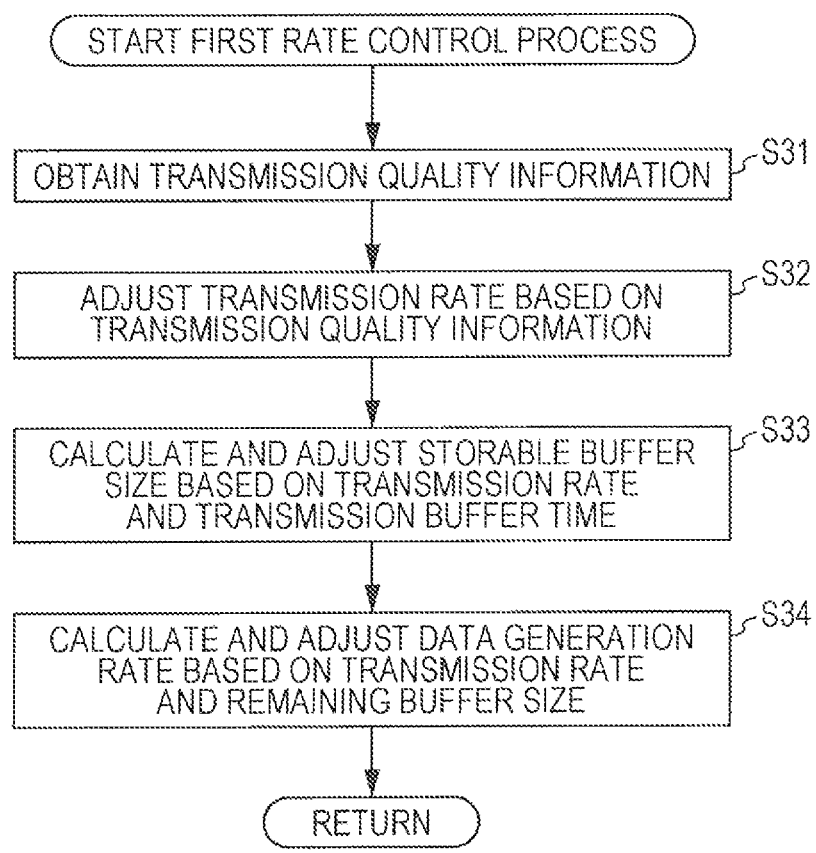
FIG. 5 is a flowchart for describing details of a first rate control process in step S9 of FIG. 4.

In step S34, on the basis of the transmission rate R fed from the rate control unit 115 and the remaining buffer size $b_r$ fed from the buffer control unit 112, the encoding unit 111 calculates the data generation rate of the encoding processing performed in step S1 of FIG. 4.

The first rate control process is terminated here and the process returns to step S9 of FIG. 4. The process then proceeds to step S10.

Description of Operations of Receiving Apparatus 102

Next, a reception process (hereinafter, referred to as a first reception process) performed by the receiving apparatus 102 will be described with reference to a flowchart of FIG. 6.

In step S51, the RTP receiving unit 121 receives RTP packets transmitted from the RTP transmitting unit 113 via the network 103, and supplies the received RTP packets to the reception buffer 122 for storage.

In step S52, the decoding unit 123 reads out the RTP packets from the reception buffer 122 and assembles the read out RTP packets, thereby generating encoded data to be decoded.

In step S53, the decoding unit 123 performs, on the generated encoded data, decoding processing corresponding the encoding processing performed in the encoding unit 111. The decoding unit 123 outputs the resulting image data to a monitor or the like, not illustrated.

In step S54, the RTCP unit 124 performs communication with the RTCP unit 114 of the transmitting apparatus 101 via the network 103 in accordance with the RTCP. In this way, the RTCP unit 114 collects the transmission quality information of the data channel between the transmitting apparatus 101 and the receiving apparatus 102.

In step S55, the control unit 125 determines whether or not to terminate the first reception process on the basis of an operation signal fed from the operation unit 126 or the like. If the control unit 125 determines not to terminate the first reception process, the process returns to step S51. The similar processing is performed thereafter.

If the control unit 125 determines to terminate the first reception process in step S55, the first reception process is terminated.

As described above, in the first reception process, the transmission quality information used by the transmitting apparatus 101 to adjust the transmission rate R is supplied to the transmitting apparatus 101 in accordance with the RTCP.

Since this allows the transmitting apparatus 101 to adjust the transmission rate R on the basis of the transmission quality information fed from the receiving apparatus 102, delay caused by the state of the data channel, such as the network 103, may be made small so that the delay is ignorable.

Discarding RTP Packets According to Priority

FIGS. 7A and 7B illustrate an example case in which the priority is attached to RTP packets and the RTP packets are discarded in the order based on the attached priority.

In FIGS. 7A and 7B, an RTP packet L1 represents packetized (coefficient data of) high-frequency components of image data that has been encoded. Additionally, an RTP packet L3 represents packetized low-frequency components of the image data that has been encoded. Further, an RTP packet L2 represents packetized intermediate-frequency components (between the high-frequency components and the low-frequency components) of the image data that has been encoded.

For example, upon being supplied with the transmission rate $R_{n+1}$ ($=\frac{2}{3} \times R_n$) from the rate control unit 115, the buffer control unit 112 adjusts the current storable buffer size $B_n$ illustrated in FIG. 7A to the storable buffer size $B_{n+1}$ ($=\frac{2}{3} \times B_n$) illustrated in FIG. 7B on the basis of Equation (1).

In this case, as illustrated in FIG. 7B, the buffer data size $b_i$ of the transmission buffer 112a exceeds the adjusted storable buffer size $B_{n+1}$. Accordingly, the buffer control unit 112 preferentially discards, for example, RTP packets of high-frequency components out of data stored in the transmission buffer 112a until the buffer data size $b_i$ becomes smaller than or equal to the storable buffer size $B_{n+1}$.

More specifically, for example, the buffer control unit 112 discards the RTP packet L1 of the high-frequency components, thereby adjusting the buffer data size $b_i$ to be smaller than or equal to the storable buffer size $B_{n+1}$ as illustrated in FIG. 7B.

Here, RTP packets of high-frequency components are preferentially discarded because, in image data, lower-frequency components are elements for constructing a rough image (e.g., an image in which a person displayed in the image can be roughly recognized as a human figure).

Meanwhile, high-frequency components are used to increase the image quality from a rough image to a detailed image (e.g., an image in which a person displayed in the image can be recognized in detail). As the priority of RTP packets, for example, the priority written in "Tos (Type of Service)" or "DSCP (Differentiated Service Code Point)" in an IP header recited in "Definition of the Differentiated Services Field (DS Field) in the IPv4 and IPv6 Headers" of IETF RFC 2474, or the priority written in "Cos (Class of Service)" in the IEEE 802.1Q tag may also be used.

Although the transmitting apparatus 101 that transmits RTP packets with low delay has been described in the first embodiment, the technique disclosed by this disclosure is applicable to, for example, a transmitting/receiving apparatus having the functions of the transmitting apparatus 101 and the receiving apparatus 102.

Additionally, a transmitting/receiving apparatus without the functions of the encoding unit 111 and the decoding unit 123, e.g., a NIC (Network Interface Card) or a wireless relay apparatus such as a wireless LAN (Local Area Network) access point, may be adopted as the transmitting/receiving apparatus that enables low-delay data transmission.

Next, as a second embodiment, a NIC that enables low-delay data transmission will be described with reference to FIGS. 8 to 12. Additionally, as a third embodiment, a wireless relay apparatus that enables low-delay data transmission will be described with reference to FIG. 13.

2. Second Embodiment

FIG. 8 illustrates an example of a NIC 142 that is inserted into and connected to a card slot of a personal computer 141 (hereinafter, referred to as a PC 141).

The PC 141 mainly includes an encoding unit 151 and a decoding unit 152. The PC 141 transmits and receives packets via the NIC 142.

The encoding unit 151 performs processing similar to that of the encoding unit 111 of FIG. 1. More specifically, the encoding unit 151 calculates a data generation rate on the basis of a transmission rate R and a remaining buffer size $b_r$ that are fed from the NIC 142.

The encoding unit 151 performs encoding processing on image data input from the outside (VIDEO IN) at the calculated data generation rate, and packetizes the resulting encoded data. The encoding unit 151 outputs packets obtained by the packetization to the NIC 142.

The decoding unit 152 performs processing similar to that of the decoding unit 123 of FIG. 1. More specifically, the decoding unit 152 assembles packets fed from the NIC 142 to generate encoded data, performs decoding processing on the generated encoded data, and outputs the resulting image data to a monitor or the like, not illustrated.

The NIC 142 includes a receiving unit 161, a reception buffer 162, a rate control unit 163, a buffer control unit 164 including a transmission buffer 164a, a modulating unit 165, and a transmitting unit 166.

The receiving unit 161 receives packets transmitted from the outside, and supplies the received packets to the reception buffer 162 for storage. The receiving unit 161 also generates transmission quality information on the basis of a packet receiving state or the like, and supplies the transmission quality information to the rate control unit 163.

The reception buffer 162 temporarily stores the packets fed from the receiving unit 161, and outputs the packets to the decoding unit 152 of the PC 141.

The rate control unit 163 adjusts the transmission rate R and a modulation method of the NIC 142 on the basis of the transmission quality information fed from the receiving unit 161 and the transmitting unit 166. The rate control unit 163 supplies the adjusted transmission rate R to the buffer control unit 164 and the transmitting unit 166. The rate control unit 163 also supplies the adjusted modulation method to the modulating unit 165.

The buffer control unit 164 performs processing similar to that of the buffer control unit 112 of FIG. 1. More specifically, as illustrated in FIG. 9, the buffer control unit 164 changes a storable buffer size B on the basis of the transmission rate R fed from the rate control unit 163 and a predetermined transmission buffer time T using Equation (1).

The buffer control unit 164 also generates the remaining buffer size $b_r$ obtained by subtracting a buffer data size $b_i$ of the transmission buffer 164a from the storable buffer size B. The buffer control unit 164 then supplies the generated remaining buffer size $b_r$ and the transmission rate R fed from the rate control unit 163 to the encoding unit 151 as illustrated in FIG. 9.

Figure 9:
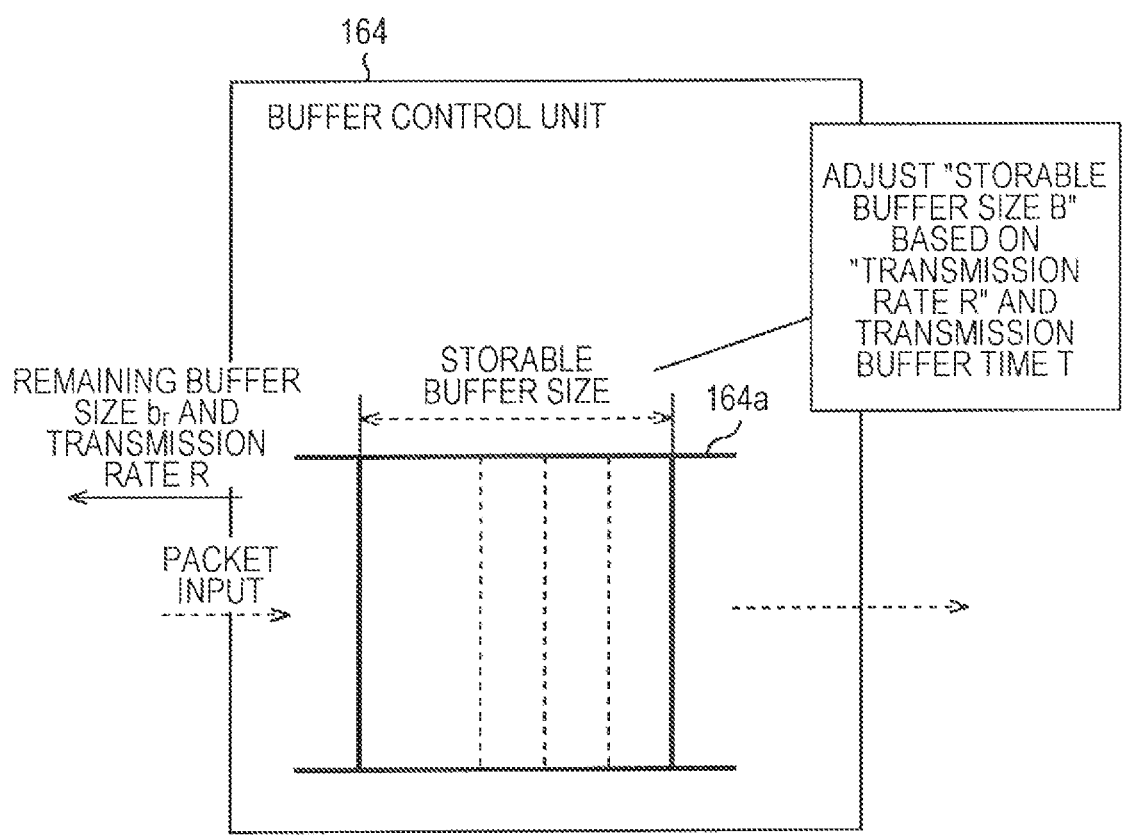
FIG. 9 is a diagram illustrating an example of a process performed by a buffer control unit of FIG. 8.

Further, as illustrated in FIG. 9, the buffer control unit 164 supplies the packets fed from the encoding unit 151 to the transmission buffer 164a thereof for storage.

The buffer control unit 164 performs smoothed transmission in which packets are sent (output) from the transmission buffer 164a to the modulating unit 165 at the transmission rate R fed from the rate control unit 163.

The transmission buffer 164a performs processing similar to that of the transmission buffer 112a of FIG. 1. More specifically, for example, the transmission buffer 164a performs smoothed transmission in accordance with the control of the buffer control unit 164. That is, the transmission buffer 164a functions as a smoothing buffer that performs smoothing so that an output rate of outputting packets matches the transmission rate R fed from the rate control unit 163.

The transmission buffer 164a stores packets fed from the encoding unit 151 with the storable buffer size B that is adjusted by the buffer control unit 164, and outputs the packets on an FIFO basis. It is assumed that the transmission buffer 164a has a sufficiently large storage capacity, which is larger than or equal to the maximum storable buffer size B that can be adjusted.

The modulating unit 165 modulates the packets fed from the buffer control unit 164 using the modulation method informed from the rate control unit 163, and supplies the modulated packets to the transmitting unit 166.

The transmitting unit 166 transmits the packets fed from the modulating unit 165 at the transmission rate R informed from the rate control unit 163. The transmitting unit 166 also generates transmission quality information on the basis of a packet sending state or the like, and supplies the transmission quality information to the rate control unit 163.

Description of Operations of NIC 142

Next, a transmission process (hereinafter, referred to as a second transmission process) performed by the NIC 142 will be described with reference to a flowchart of FIG. 10.

In step S71, the buffer control unit 164 obtains packets from the encoding unit 151.

In step S72, the buffer control unit 164 supplies the packets fed from the encoding unit 151 to the transmission buffer 164a thereof for storage. The buffer control unit 164 outputs the packets from the transmission buffer 164a to the modulating unit 165 at an output rate that is the same as the transmission rate R informed from the rate control unit 163.

In step S73, the buffer control unit 164 determines whether or not the storable buffer size B of the transmission buffer 164a is larger than or equal to the buffer data size $b_i$ of the transmission buffer 164a.

If the buffer control unit 164 determines in step S73 that the storable buffer size B is not larger than or equal to the buffer data size $b_i$, the process proceeds to step S74.

In step S74, the buffer control unit 164 discards the packets stored in the transmission buffer 164a so that the buffer data size $b_i$ becomes smaller than or equal to the storable buffer size B. The process then returns to step S71 and the similar processing is performed thereafter.

In step S74, as illustrated in FIGS. 7A and 7B, the discarding priority may be attached to the packets and the order of discarding the packets may be determined in accordance with the priority.

If it is determined in step S73 that the storable buffer size B is larger than or equal to the buffer data size $b_i$, the process proceeds to step S75.

In step S75, the modulating unit 165 modulates the packets fed from the buffer control unit 164 using the modulation method informed from the rate control unit 163, and supplies the modulated packets to the transmitting unit 166.

In step S76, the transmitting unit 166 transmits the packets fed from the modulating unit 165 at the transmission rate R informed from the rate control unit 163.

In step S77, a second rate control process is performed in which the rate control unit 163 adjusts the transmission rate R and the buffer control unit 164 adjusts the storable buffer size B. Details of this second rate control process will be described later with reference to a flowchart of FIG. 11.

In step S78, a control unit, not illustrated, of the NIC 142 determines whether or not to terminate the second transmission process on the basis of a control signal fed from the PC 141 or the like. If the control unit determines not to terminate the second transmission process, the process returns to step S71 and the similar processing is performed thereafter.

If the control unit, not illustrated, of the NIC 142 determines to terminate the second transmission process in step S78, the second transmission process is terminated.

As described above, since the transmission rate R is adjusted in accordance with a state of a data channel for transmitting and receiving packets in the second transmission process, transmission delay or packet loss of packets can be suppressed regardless of the state of the data channel. Accordingly, image quality degradation of image data caused by transmission delay and packet loss of the packets can be suppressed.

Additionally, the storable buffer size B is changed in response to adjustment of the transmission rate R in the second transmission process, so that the transmission buffer time of the transmission buffer 164a is maintained at a certain time T. Accordingly, image data can be transmitted with low delay regardless of a state of a data channel.

Next, details of the second rate control process in step S77 of FIG. 10 will be described with reference to a flowchart of FIG. 11.

In step S91, the rate control unit 163 obtains transmission quality information from the receiving unit 161 and the transmitting unit 166. The receiving unit 161 generates the transmission quality information on the basis of a packet receiving state or the like, and supplies the transmission quality information to the rate control unit 163. The transmitting unit 166 generates the transmission quality information on the basis of a packet sending state or the like, and supplies the transmission quality information to the rate control unit 163.

In step S92, the rate control unit 163 adjusts the transmission rate R and the modulation method on the basis of the transmission quality information fed from the receiving unit 161 and the transmitting unit 166. The rate control unit 163 then supplies the adjusted transmission rate R to the buffer control unit 164 and the transmitting unit 166, and supplies the adjusted modulation method to the modulating unit 165.

In step S93, the buffer control unit 164 calculates and adjusts the storable buffer size B of the transmission buffer 164a on the basis of the transmission rate R fed from the rate control unit 163 and the predetermined transmission buffer time T using Equation (1).

In step S94, the buffer control unit 164 informs the encoding unit 151 of the remaining buffer size $b_r$, which is obtained by subtracting the buffer data size $b_i$ of data stored in the transmission buffer 164a from the calculated storable buffer size B. The buffer control unit 164 also informs the encoding unit 151 of the transmission rate R fed from the rate control unit 163. In this way, the encoding unit 151 calculates the data generation rate on the basis of the transmission rate R and the remaining buffer size $b_r$ informed from the buffer control unit 164, and performs encoding processing at the calculated data generation rate.

Figure 10:
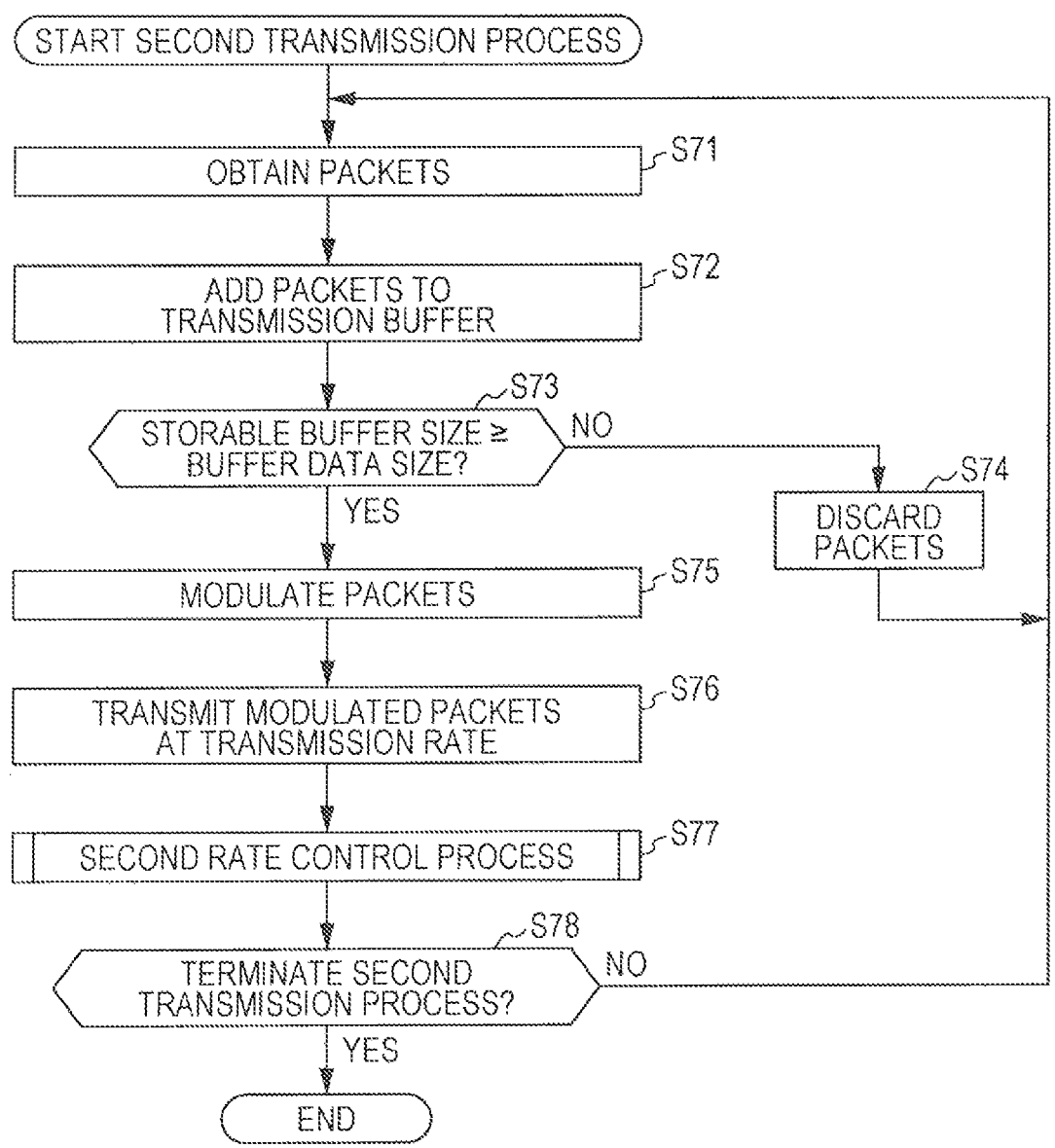
FIG. 10 is a flowchart for describing a transmission process performed by the NIC of FIG. 8.
Figure 11:
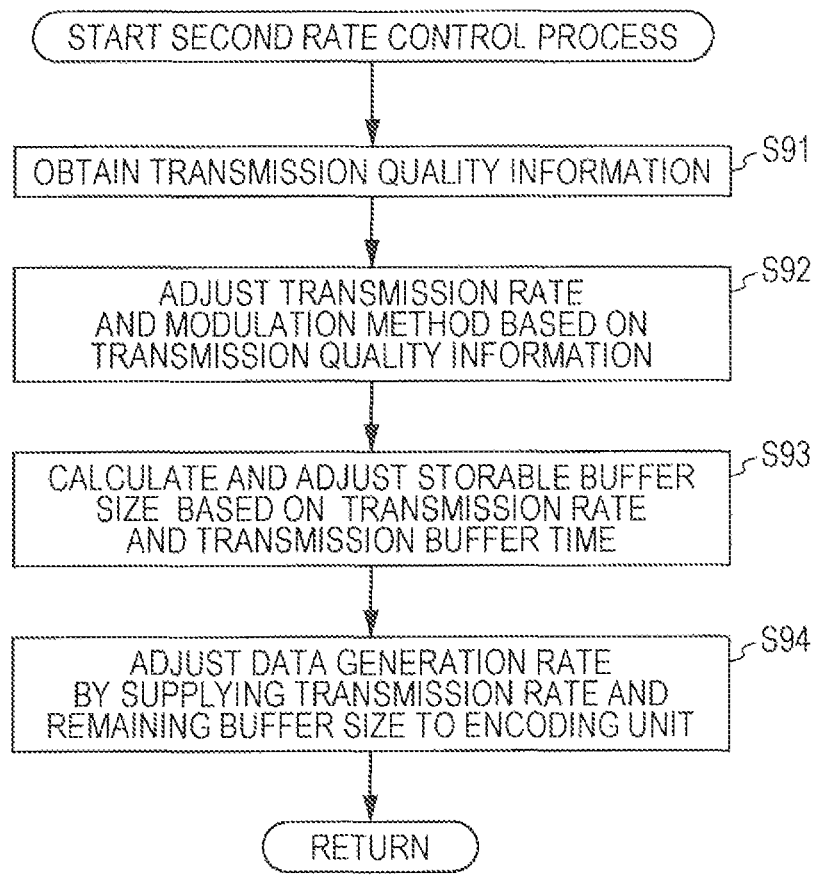
FIG. 11 is a flowchart for describing details of a second rate control process in step S77 of FIG. 10.

The second rate control process is terminated here and the process returns to step S77 of FIG. 10. The process then proceeds to step S78.

Figure 12:
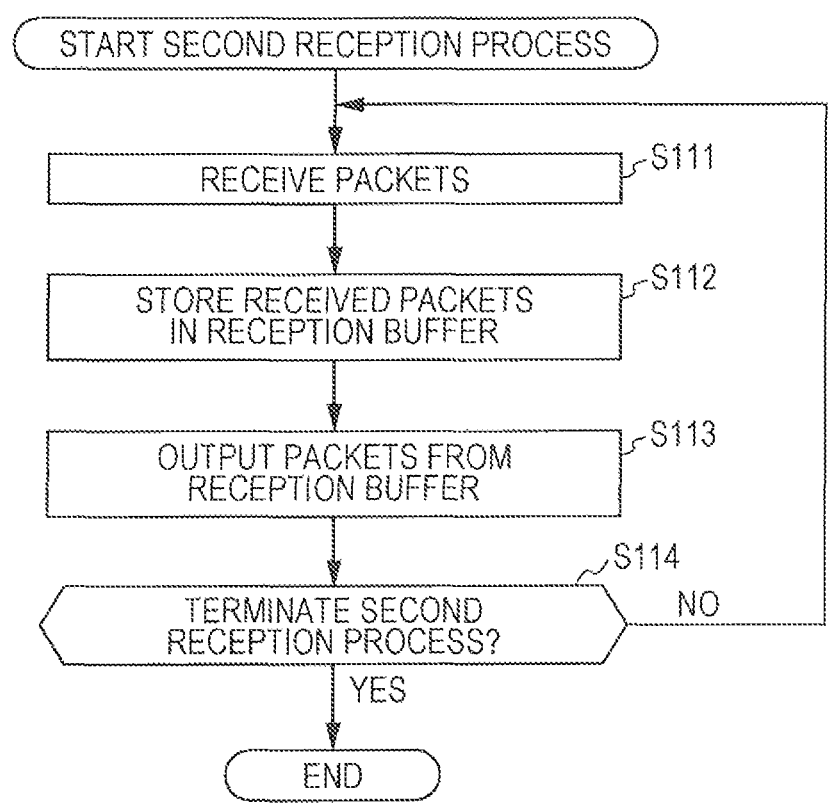
FIG. 12 is a flowchart for describing a reception process performed by the NIC of FIG. 8.

Next, a reception process (hereinafter, referred to as a second reception process) performed by the NIC 142 will be described with reference to a flowchart of FIG. 12.

In step S111, the receiving unit 161 receives packets transmitted from the outside. In step S112, the receiving unit 161 supplies the received packets to the reception buffer 162 for storage.

In step S113, the reception buffer 162 temporarily stores the packets fed from the receiving unit 161, and outputs the packets to the decoding unit 152 of the PC 141.

In step S114, the control unit, not illustrated, of the NIC 142 determines whether or not to terminate the second reception process on the basis of a control signal fed from the PC 141 or the like. If the control unit determines not to terminate the second reception process, the process returns to step S111 and the similar processing is performed thereafter.

If the control unit, not illustrated, of the NIC 142 determines to terminate the second reception process in step S114, the second reception process is terminated.

3. Third Embodiment

Figure 13:
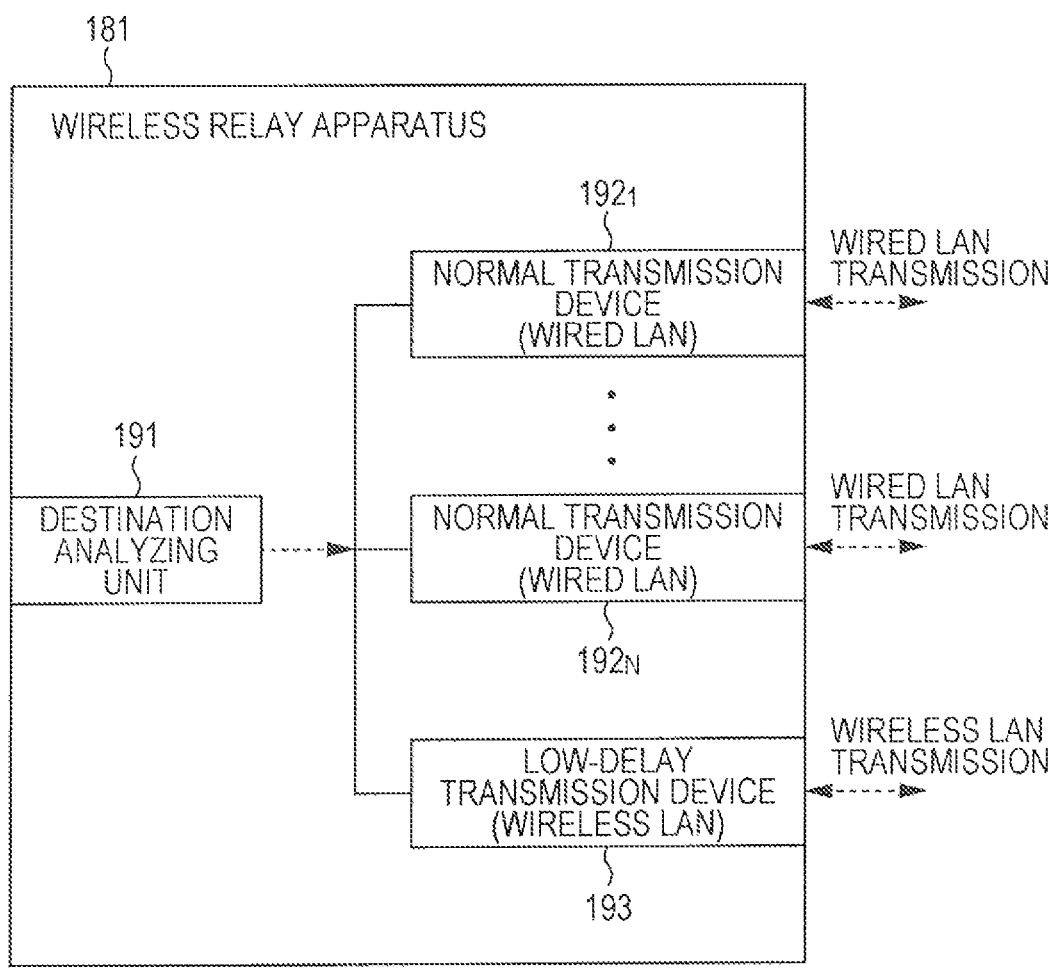
FIG. 13 is a block diagram illustrating an example of a configuration of a wireless relay apparatus according to a third embodiment.

FIG. 13 illustrates an example of a wireless relay apparatus that enables low-delay data transmission.

This wireless relay apparatus 181 is, for example, a wireless LAN access point that relays image data or the like transmitted or received between a network and a PC.

The wireless relay apparatus 181 includes a destination analyzing unit 191, normal transmission devices $192_1$ to $192_N$, and a low-delay transmission device 193.

The destination analyzing unit 191 performs analysis of a destination address (e.g., a MAC address) written in a header included in a packet fed from each of the normal transmission devices $192_1$ to $192_N$ and the low-delay transmission device 193.

The destination analyzing unit 191 returns (information indicating) the destination of the packet obtained by the analysis of the destination address to the source of the packet (any of the normal transmission devices $192_1$ to $192_N$ or the low-delay transmission device 193).

The normal transmission device $192_1$ receives a packet and supplies the packet to the destination analyzing unit 191. The normal transmission device $192_1$ also transmits the received packet to the destination fed from the destination analyzing unit 191. Since the normal transmission devices $192_2$ to $192_N$ are configured in the same manner as the normal transmission device $192_1$, the description thereof is omitted.

The low-delay transmission device 193 receives a packet and supplies the packet to the destination analyzing unit 191. The low-delay transmission device 193 also transmits the received packet to the destination fed from the destination analyzing unit 191. Since the low-delay transmission device 193 is configured in the same manner as the NIC 142 of FIG. 8, the low-delay transmission device 193 is capable of transmitting packets to the destination fed from the destination analyzing unit 191 with low delay.

4. Fourth Embodiment

Example of Configuration of Transmitting/Receiving System 200

Figure 14:
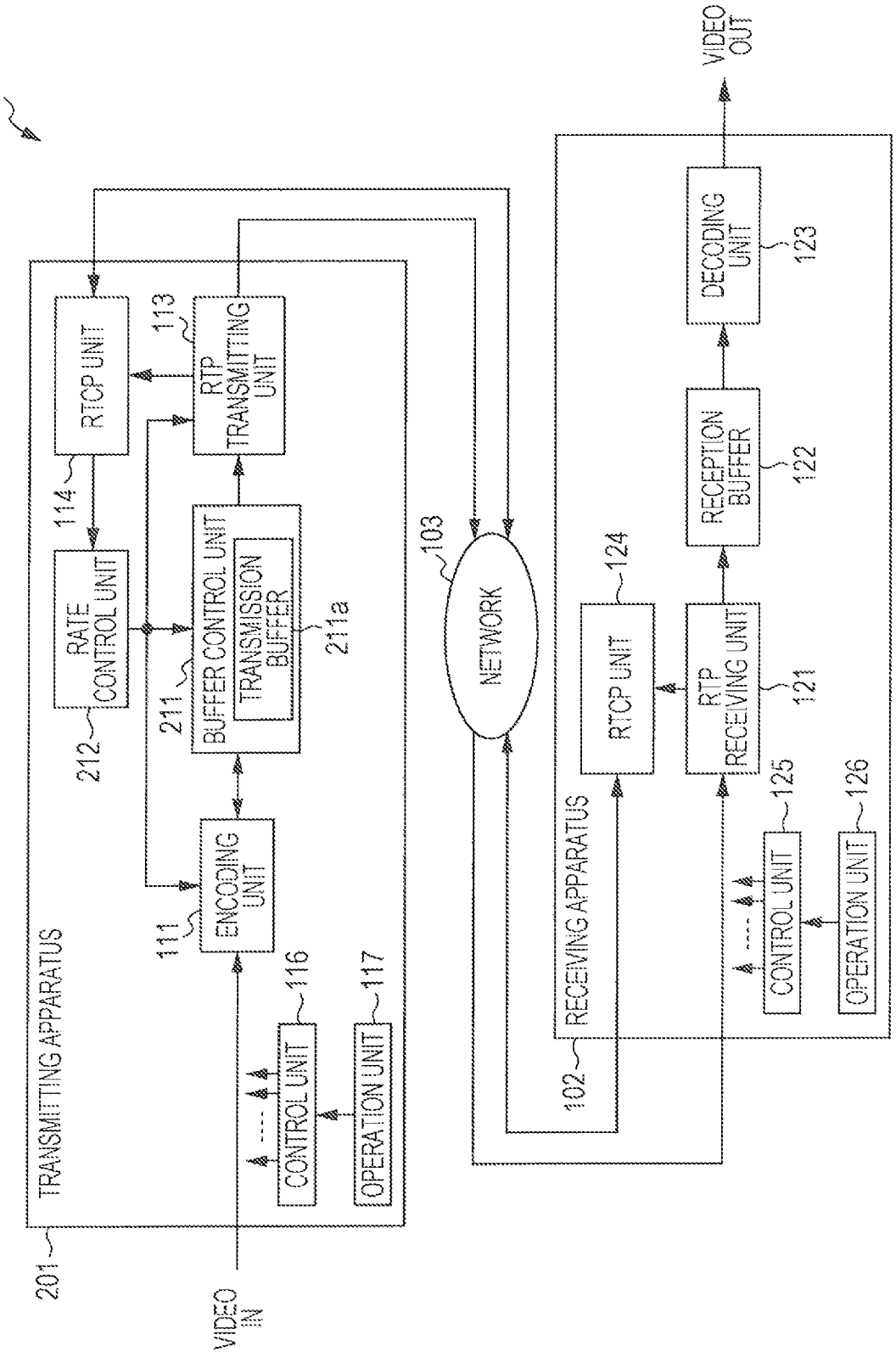
FIG. 14 is a block diagram illustrating an example of a configuration of a second transmitting/receiving system according to a fourth embodiment.

FIG. 14 illustrates an example of a configuration of a transmitting/receiving system 200 according to a fourth embodiment.

Since portions of this transmitting/receiving system 200 that are configured in the same manner as those of the transmitting/receiving system 100 according to the first embodiment are assigned the same reference characters, the description thereof will be appropriately omitted.

More specifically, this transmitting/receiving system 200 is configured in the same manner as the transmitting/receiving system 100 according to the first embodiment except that a transmitting apparatus 201 is provided instead of the transmitting apparatus 101 of FIG. 1.

The transmitting apparatus 201 is configured in the same manner as the transmitting apparatus 101 of FIG. 1 except that a rate control unit 212 and a buffer control unit 211 that includes a transmission buffer 211a are provided instead of the rate control unit 115 and the buffer control unit 112.

Figure 15:
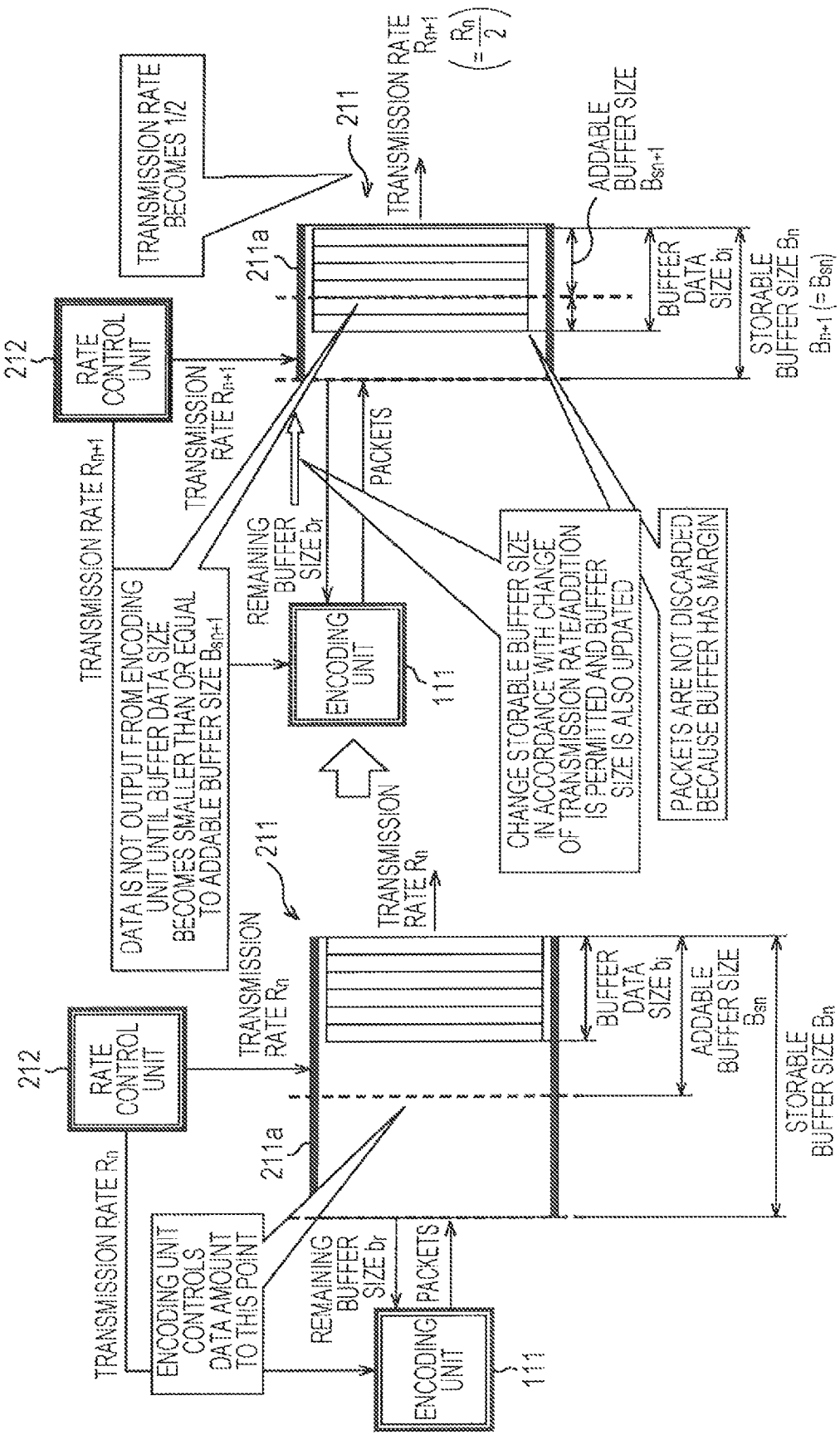
FIGS. 15A and 15B are diagrams illustrating an example of a process performed by a buffer control unit of FIG. 14.

Here, as illustrated in FIG. 15A, in this transmitting/receiving system 200, data (RTP packets) is stored in the transmission buffer 211a with a data size that is smaller than or equal to an addable buffer size $B_{sn}$, which is smaller than a storable buffer size $B_n$ of the transmission buffer 211a.

In response to adjustment of a transmission rate $R_n$ to the transmission rate $R_{n+1}$, the storable buffer size $B_n$ is changed to the storable buffer size $B_{n+1}$ that is larger than or equal to the addable buffer size $B_{sn}$, i.e., to the storable buffer size $B_{n+1}$ that is larger than or equal to a buffer data size $b_i$, as illustrated in FIG. 15B.

In the fourth embodiment, low-delay data transmission is realized without discarding data stored in the transmission buffer 211a by preventing the storable buffer size $B_{n+1}$ from becoming smaller than the buffer data size $b_i$ in this way.

That is, the fourth embodiment greatly differs from the first embodiment in that discarding of data stored in the transmission buffer 211a can be prevented.

In the fourth embodiment, a certain restriction is applied to adjustment of the transmission rate R in order to make the storable buffer size $B_{n+1}$ larger than or equal to the addable buffer size $B_{sn}$.

In FIG. 14, the buffer control unit 211 stores RTP packets fed from the encoding unit 111 in the transmission buffer 211a within a range not exceeding the addable buffer size $B_s$ instead of the storable buffer size B, and outputs the RTP packets on an FIFO basis.

The buffer control unit 211 also changes the storable buffer size B and the addable buffer size $B_s$ on the basis of the transmission rate R fed from the rate control unit 212. The buffer control unit 211 changes the storable buffer size B and the addable buffer size $B_s$ so that RTP packets can be output within a transmission buffer time T from when the RTP packets were stored in the transmission buffer 211a, without discarding the RTP packets stored in the transmission buffer 211a.

The transmission buffer 211a stores the RTP packets output from the encoding unit 111 within a range of the addable buffer size $B_s$ that is smaller than the storable buffer size B, and outputs the RTP packets to the RTP transmitting unit 113 on an FIFO basis.

The rate control unit 212 adjusts the transmission rate R on the basis of transmission quality information fed from the RTCP unit 114 under a certain restriction, and informs the encoding unit 111, the RTP transmitting unit 113, and the buffer control unit 211 of the transmission rate R.

Here, as the restriction for changing the transmission rate R, the rate control unit 212 applies a restriction that a rate change ratio L $(=R_{n+1}/R_n)$ of changing the transmission rate $R_n$ to the transmission rate $R_{n+1}$ is larger than or equal to a predetermined lower limit $L_{min}$, for example.

Additionally, as the restriction for adjusting (changing) the transmission rate R, the rate control unit 212 restricts (prohibits) the transmission rate R from being changed during a rate change minimum interval $T_i$ (sec) from when the transmission rate R was changed to be lower, for example.

Details of Buffer Control Unit 211 and Rate Control Unit 212

Figure 16:
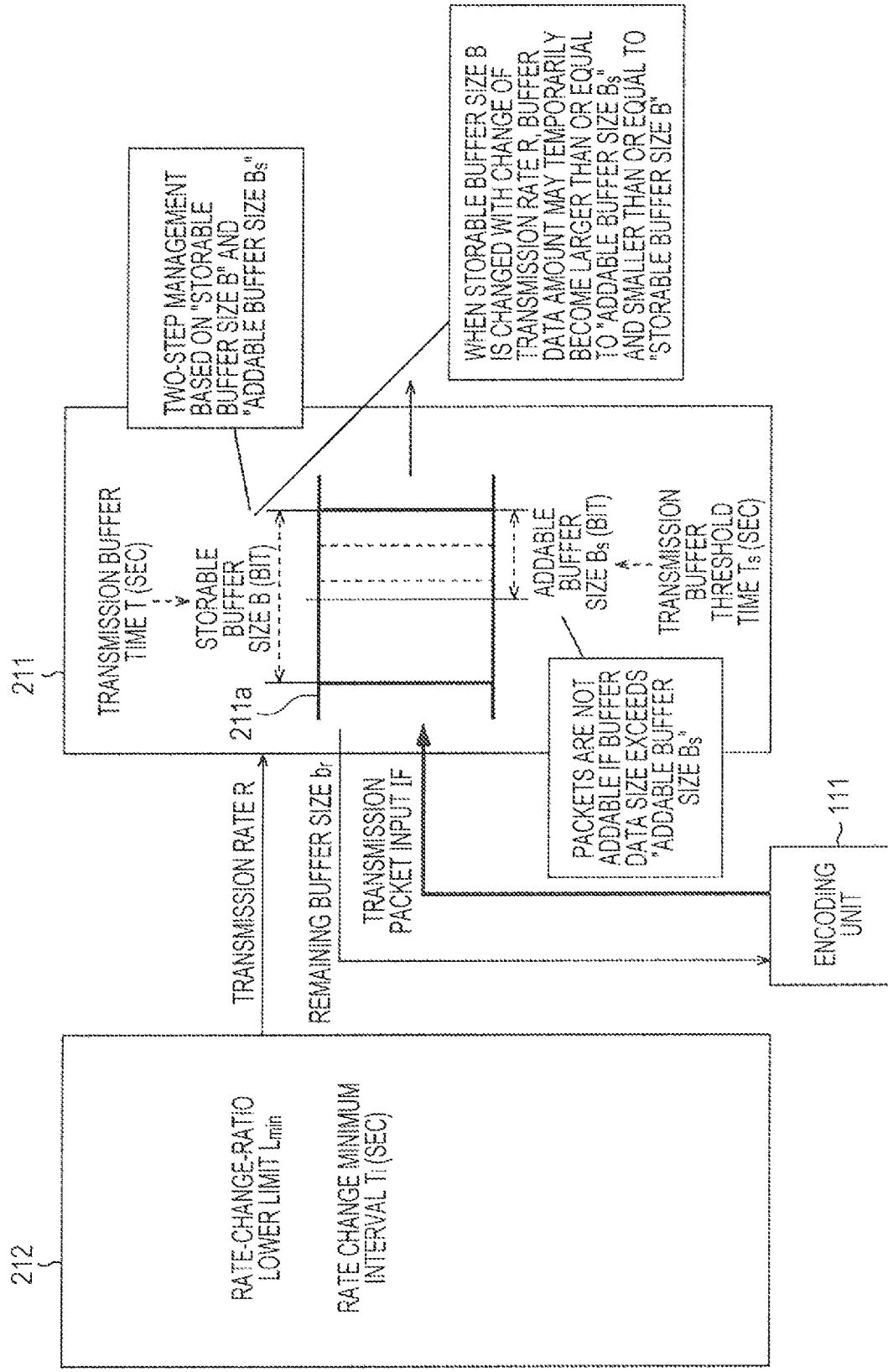
FIG. 16 is a diagram for describing an example of a process performed by the buffer control unit and a rate control unit of FIG. 14.

FIG. 16 illustrates an example of details of a process performed by the buffer control unit 211 and the rate control unit 212.

The buffer control unit 211 changes the storable buffer size B on the basis of the transmission rate R fed from the rate control unit 212 and the predetermined transmission buffer time T using Equation (1) described above.

The buffer control unit 211 also changes the addable buffer size $B_s$ in accordance with a transmission buffer threshold time $T_s$ and the transmission rate R fed from the rate control unit 212 using Equation (2) below so that the transmission buffer threshold time is maintained at a certain predetermined time $T_s$ (hereinafter, also referred to as transmission buffer threshold time $T_s$).

$$B_s \text{ (bit)} = R \text{ (bps)} \times T_s \text{ (sec)} \qquad (2)$$

Here, the transmission buffer threshold time $T_s$ represents a maximum time from when data was stored in the transmission buffer 211a to when the data is output within a range that satisfies a buffer capacity that is smaller than or equal to the addable buffer size $B_s$. Additionally, it is assumed that the transmission buffer threshold time $T_s$ is a value smaller than the transmission buffer time T.

The rate control unit 212 adjusts the transmission rate R on the basis of transmission quality information fed from the RTCP unit 114 under a certain restriction.

More specifically, for example, the rate control unit 212 determines the transmission rate $R_{n+1}$ within a range that satisfies a change condition that the rate change ratio L $(=R_{n+1}/R_n)$ of changing (adjusting) the transmission rate $R_n$ to the transmission rate $R_{n+1}$ becomes larger than or equal to the lower limit $L_{min}$. Here, the lower limit $L_{min}$ is determined on the basis of the transmission buffer time T and the transmission buffer threshold time $T_s$ using Equation (3) below.

$$T_s \leq T \times L_{min} \quad (3)$$

More specifically, for example, the rate control unit 212 calculates a transmission rate $R_c$ on the basis of the transmission quality information fed from the RTCP unit 114 in the same manner as the rate control unit 115 of FIG. 1. If the transmission rate $R_c$ satisfies the aforementioned change condition, the rate control unit 212 determines the transmission rate $R_c$ as the changed transmission rate $R_{n+1}$ as indicated by Equation (4) below.

$$\text{If } R_c/R_n \geq L_{min}, R_{n+1} = R_c \quad (4)$$

In this case, the rate change ratio L is larger than or equal to the lower limit $L_{min}$ and, thus, the change condition is satisfied.

If the aforementioned change condition is not satisfied, the rate control unit 212 modifies the transmission rate $R_c$ so that the change condition is satisfied as indicated by Equation (5) below and determines the changed transmission rate $R_{n+1}$.

$$\text{If } R_c/R_n < L_{min}, R_{n+1} = L_{min} \times R_n \quad (5)$$

In this case, the rate change ratio L is equal to the lower limit $L_{min}$ and, thus, the change condition is satisfied.

When the transmission rate R is adjusted to be lower, the buffer data size $b_i$ may exceed the addable buffer size $B_{sn+1}$ as illustrated in FIG. 15B. Accordingly, in this case, the rate control unit 212 restricts adjustment of the transmission rate R until the buffer data size $b_i$ becomes smaller than or equal to the addable buffer size $B_{sn+1}$.

More specifically, for example, when the transmission rate R is adjusted to be lower, the rate control unit 212 restricts (prohibits) the transmission rate R from being adjusted until the rate change minimum interval $T_i$ (sec) indicated by Equation (6) below passes from the adjustment of the transmission rate R.

$$T_i = T - T_s \quad (6)$$

Here, the rate change minimum interval $T_i$ represents a maximum time from when the transmission rate $R_n$ was changed to the transmission rate to when the buffer data size $b_i$ becomes smaller than or equal to the addable buffer size $B_{sn+1}$.

When the transmission rate R is adjusted to be higher, the buffer data size $b_i$ does not exceed the addable buffer size $B_{sn+1}$. Accordingly, the rate control unit 212 does not have to restrict adjustment of the transmission rate R.

In the first embodiment, the encoding unit 111 adjusts encoding parameters to prevent the buffer data size $b_i$ from becoming larger than the storable buffer size B. Regarding this point, the fourth embodiment differs in that the encoding unit 111 adjusts encoding parameters to prevent the buffer data size $b_i$ from becoming larger than the addable buffer size $B_s$. Additionally, as illustrated in FIG. 15B above, the encoding unit 111 does not output RTP packets to the buffer control unit 211 (transmission buffer 211a) until the buffer data size $b_i$ becomes smaller than or equal to the addable buffer size $B_s$ on the basis of the remaining buffer size $b_r$ fed from the buffer control unit 211 or the like.

Description of Operations of Transmitting Apparatus 201

Next, a transmission process (hereinafter, referred to as a third transmission process) performed by the transmitting apparatus 201 will be described with reference to a flowchart of FIG. 17.

In step S131, the rate control unit 212 sets the transmission buffer time T and the transmission buffer threshold time $T_s$ in accordance with a user setting operation or the like. The rate control unit 212 also sets the lower limit $L_{min}$ on the basis of the set transmission buffer time T and the set transmission buffer threshold time $T_s$ using Equation (3).

Further, the rate control unit 212 sets the rate change Minimum interval $T_i$ on the basis of the set transmission buffer time T and the set transmission buffer threshold time $T_s$ using Equation (6).

In step S132, the encoding unit 111 performs encoding processing on image data fed from the outside at a data generation rate calculated in accordance with the transmission rate R fed from the rate control unit 212.

In step S133, the encoding unit 111, for example, packetizes (converts) encoded data obtained by the encoding processing into a plurality of RTP packets, and outputs the plurality of resulting RTP packets to the buffer control unit 211.

In step S134, the buffer control unit 211 supplies the RTP packets fed from the encoding unit 111 to the transmission buffer 211a thereof for storage. The buffer control unit 211 outputs the RTP packets from the transmission buffer 211a to the RTP transmitting unit 113 on an FIFO basis at an output rate that is the same as the transmission rate R informed from the rate control unit 212.

In step S135, the RTP transmitting unit 113 determines whether or not the RTP packets fed from the buffer control unit 211 are transmittable on the basis of an RTP packet sending state or the like. After it is determined that the packets are transmittable, the process proceeds to step S136.

In step S136, in accordance with the RTP, the RTP transmitting unit 113 transmits the RTP packets fed from the buffer control unit 211 to the receiving apparatus 102 via the network 103 at the transmission rate R informed by the rate control unit 212.

In step S137, the RTCP unit 114 performs communication with the RTCP unit 124 of the receiving apparatus 102 via the network 103 in accordance with the RTCP, collects transmission quality information of a data channel between the transmitting apparatus 201 and the receiving apparatus 102, and supplies the transmission quality information to the rate control unit 212.

In step S138, the rate control unit 212 determines whether or not the rate change minimum interval $T_i$ or longer has passed from the last change of the transmission rate R. If it is determined that the rate change minimum interval $T_i$ or longer has not passed, the process returns to step S135 and the similar processing is repeated thereafter.

If the rate control unit 212 determines in step S138 that the rate change minimum interval $T_i$ or longer has passed from the last change of the transmission rate R, the process proceeds to step S139.

When the transmission rate is set to be higher in the last change of the transmission rate R, the rate change minimum interval $T_i$ does not have to be waited. Accordingly, the processing of step S138 may be skipped.

In step S139, a third rate control process is performed in which the encoding unit 111 adjusts the data generation rate, the buffer control unit 211 adjusts the storable buffer size B and the addable buffer size $B_s$, and the rate control unit 212 adjusts the transmission rate R. Details of this third rate control process will be described later with reference to a flowchart of FIG. 18.

In step S140, the control unit 116 determines whether or not to terminate the third transmission process on the basis of an operation signal fed from the operation unit 117 or the like. If the control unit 116 determines not to terminate the third transmission process, the process returns to step S132 and the similar processing is performed thereafter.

If the control unit 116 determines to terminate the third transmission process on the basis of an operation signal fed from the operation unit 117 or the like in step S140, the third transmission process is terminated.

As described above, in the third transmission process, even if the transmission rate R is changed to be lower in the transmitting apparatus 201, low-delay data transmission is performed without discarding data stored in the transmission buffer 211a.

Accordingly, a situation may be prevented in which the quality of image data transmitted by the transmitting apparatus 201 is degraded by discarding the data stored in the transmission buffer 211a by an amount of discarded data.

Thus, the receiving apparatus 102 can receive the RTP packets from the transmitting apparatus 201 with low delay and can reproduce relatively high-quality image data obtained by assembling and decoding the received RTP packets, for example.

Details of Third Rate Control Process

Next, details of the third rate control process in step S139 of FIG. 17 will be described with reference to a flowchart of FIG. 18.

In step S161, the rate control unit 212 obtains transmission quality information from the RTCP unit 114. The RTCP unit 114 performs communication with the RTCP unit 124 of the receiving apparatus 102 via the network 103 in accordance with the RTCP, collects transmission quality information of a data channel between the transmitting apparatus 201 and the receiving apparatus 102, and supplies the transmission quality information to the rate control unit 212.

In step S162, the rate control unit 212 calculates the transmission rate $R_c$ on the basis of the transmission quality information fed from the RTCP unit 114.

In step S163, the rate control unit 212 determines whether or not a condition that the rate change ratio L $(=R_c/R_n)$ is larger than or equal to the lower limit $L_{min}$ is satisfied, on the basis of the original transmission rate $R_n$ and the calculated transmission rate $R_c$.

If the rate control unit 212 determines in step S163 that the rate change ratio L is larger than or equal to the lower limit $L_{min}$, the process proceeds to step S164. The rate control unit 212 sets the changed transmission rate $R_{n+1}$ to the transmission rate $R_c$, and supplies the encoding unit 111, the RTP transmitting unit 113, and the buffer control unit 211 with the changed transmission rate.

If the rate change ratio L is not larger than or equal to the lower limit $L_{min}$ in step S163, the process proceeds to step S165. The rate control unit 212 sets the transmission rate $R_{n+1}$ to the transmission rate $L_{min} \times R_n$, and supplies the encoding unit 111, the RTP transmitting unit 113, and the buffer control unit 211 with the transmission rate.

In step S166, the buffer control unit 211 calculates and changes the storable buffer size B of the transmission buffer 211a on the basis of the transmission rate R fed from the rate control unit 212 and the transmission buffer time T using Equation (1). The buffer control unit 211 also calculates and changes the addable buffer size $B_s$ on the basis of the transmission rate R fed from the rate control unit 212 and the transmission buffer threshold time $T_s$ using Equation (2).

Further, the buffer control unit 211 supplies the encoding unit 111 with the remaining buffer size $b_r$ obtained by subtracting the buffer data size $b_t$ of the data stored in the transmission buffer 211a from the calculated storable buffer size B.

In step S167, the encoding unit 111 calculates the data generation rate on the basis of the transmission rate R fed from the rate control unit 212 and the remaining buffer size $b_r$ fed from the buffer control unit 211.

Figure 17:
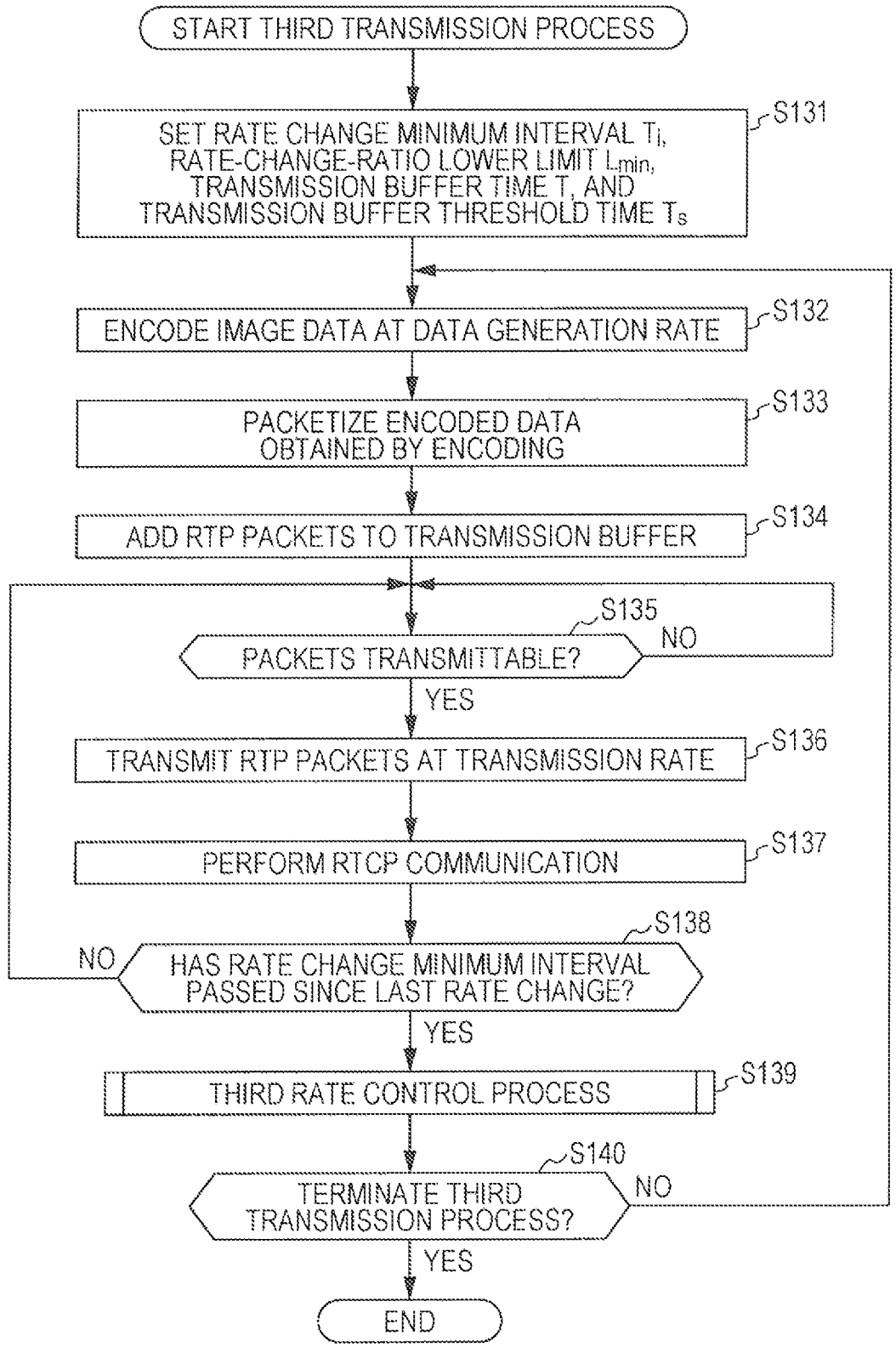
FIG. 17 is a flowchart for describing a transmission process performed by a transmitting apparatus of FIG. 14.
Figure 18:
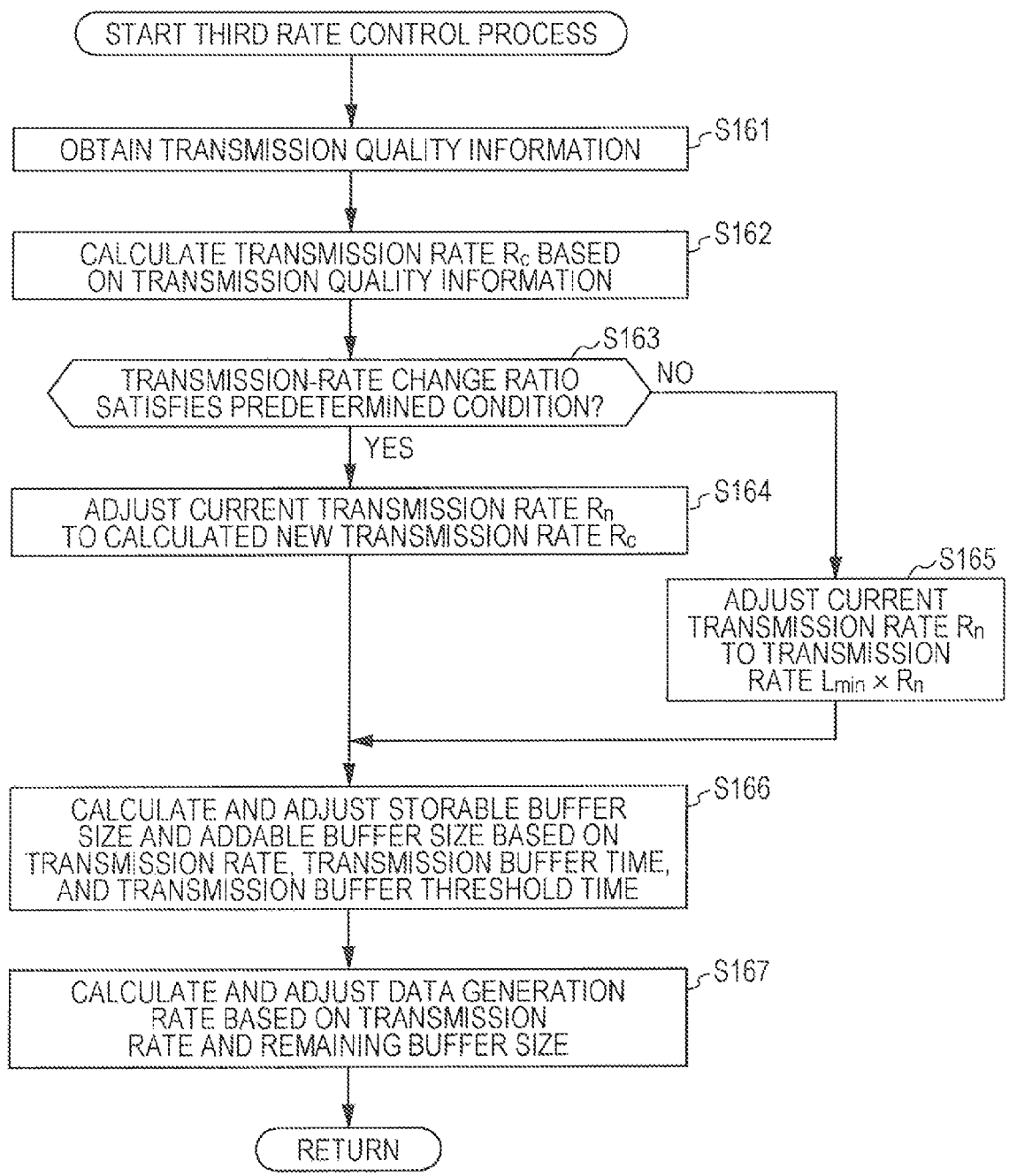
FIG. 18 is a flowchart for describing details of a third rate control process in step S139 of FIG. 17.

The third rate control process is terminated here and the process returns to step S139 of FIG. 17. The process then proceeds to step S140.

The foregoing series of processes may be executed by hardware or may be executed by software. When the series of processes are executed by software, a program constituting the software is installed, from a program recording medium, into a computer embedded in dedicated hardware or, for example, a general-purpose computer capable of executing various functions by installing various programs.

Example of Configuration of Computer

Figure 19:
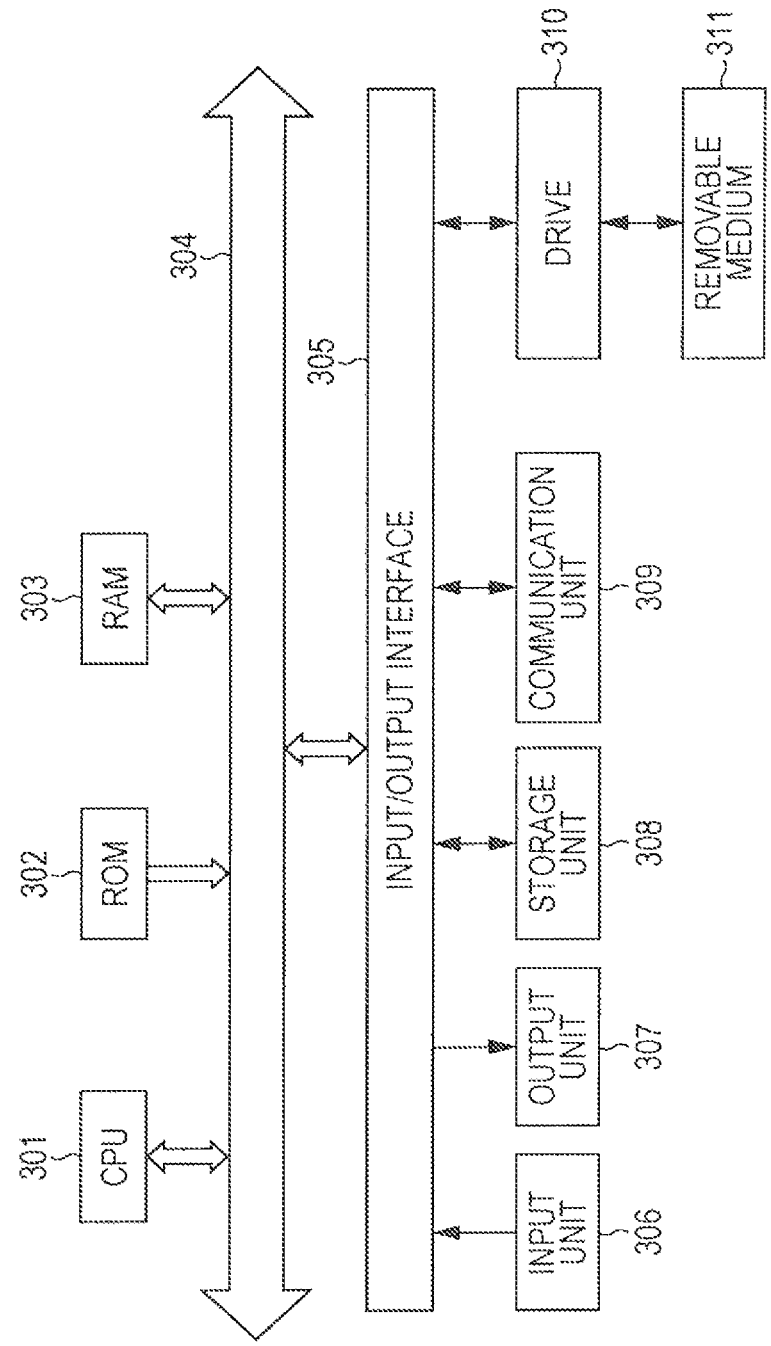
FIG. 19 is a block diagram illustrating an example of a configuration of a computer.

FIG. 19 is a block diagram illustrating an example of a hardware configuration of a computer that executes the foregoing series of processes with a program.

A CPU (Central Processing Unit) 301 executes various processes in accordance with programs stored in a ROM (Read Only Memory) 302 or a storage unit 308. A RAM (Random Access Memory) 303 appropriately stores programs executed by the CPU 301, data, and so forth. The CPU 301, the ROM 302, and the RAM 303 are connected to each other via a bus 304.

The CPU 301 is also connected to an input/output interface 305 via the bus 304. The input/output interface 305 is connected to an input unit 306 including a keyboard, a mouse, and a microphone, and to an output unit 307 including a display and a speaker. The CPU 301 executes various processes in accordance with instructions input from the input unit 306. The CPU 301 outputs the results of the processes to the output unit 307.

The storage unit 308 connected to the input/output interface 305 includes, for example, a hard disk, and stores programs executed by the CPU 301 and various kinds of data. A communication unit 309 communicates with an external apparatus via a network, such as the Internet or a local area network.

Additionally, programs may be obtained via the communication unit 309 and stored in the storage unit 308.

When a removable medium 311, such as a magnetic disk, an optical disc, a magneto-optical disk, or a semiconductor memory, is mounted, a drive 310 connected to the input/output interface 305 drives the removable medium 311 and obtains programs and data recorded thereon. The obtained programs and data are transferred to and stored in the storage unit 308 if necessary.

As illustrated in FIG. 19, a recording medium that records (stores) a program that is to be installed into a computer and is to be brought into an executable state by the computer includes the removable medium 311 that is a package medium, such as a magnetic disk (including a flexible disk), an optical disc (including a CD-ROM (Compact Disk-Read Only Memory), and a DVD (Digital Versatile Disc)), a magneto-optical disk (including an MD (Mini-Disc)), or a semiconductor memory, the ROM 302 temporarily or permanently storing the program, and a hard disk that constitutes the storage unit 308. Recording of the program on the recording medium is performed using a wired or wireless communication medium, such as a local area network, the Internet, or the digital satellite broadcasting, via the communication unit 309 serving as an interface, such as a router or a modem, if necessary.

In this specification, steps describing the aforementioned series of processes include processes that are executed chronologically in the described order and processes that are not necessarily executed chronologically but are executed in parallel or individually.

Additionally, in this specification, a system refers to an entire apparatus that includes a plurality of devices.

The embodiments of the present disclosure are not limited to the first to fourth embodiments described above and can be variously modified within the scope not departing from the gist of the present disclosure.

The present disclosure contains subject matter related to that disclosed in Japanese Priority Patent Application JP 2010-292618 filed in the Japan Patent Office on Dec. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting apparatus comprising:
   one or more processors operable to:
      adjust a transmission rate of transmitting data, wherein the one or more processors adjust the transmission rate such that a rate adjustment ratio of an adjusted transmission rate to an original transmission rate is larger than or equal to a predetermined lower limit;
      change a size of a buffer for temporarily storing the data, on the basis of the transmission rate;
      transmit the data output from the buffer; and
      cause the buffer to temporarily store the data and to output the data for transmission, the data being smaller than or equal to an addable size that is smaller than the size of the buffer.

2. The transmitting apparatus according to claim 1, wherein the one or more processors are operable to change the size of the buffer on the basis of a predetermined transmission buffer time, and wherein the one or more processors cause the buffer to output the data within the transmission buffer time from when the data was stored in the buffer.

3. The transmitting apparatus according to claim 1, wherein the one or more processors are operable to restrict the transmission rate from being newly adjusted until a predetermined restriction time passes from when the transmission rate was adjusted.

4. The transmitting apparatus according to claim 3, wherein the one or more processors are operable to restrict the transmission rate from being newly adjusted until the predetermined restriction time passes, the predetermined restriction time indicating a maximum time from when the transmission rate was adjusted to when the size of the data stored in the buffer becomes smaller than or equal to the addable size.

5. The transmitting apparatus according to claim 1, wherein the one or more processors are operable to:
   adjust an encoding parameter used in generation of encoded data obtained by encoding the data, on the basis of the transmission rate; and
   perform encoding processing based on the encoding parameter on the data, wherein the one or more processors are operable to cause the buffer to temporarily store the encoded data that is smaller than or equal to the addable size and to output the encoded data.

6. The transmitting apparatus according to claim 5, wherein the one or more processors are operable to adjust a data generation rate serving as the encoding parameter on the basis of the transmission rate, the data generation rate representing an amount of encoded data generated over a predetermined time.

7. The transmitting apparatus according to claim 1, wherein the one or more processors are operable to adjust the transmission rate on the basis of transmission quality information that represents a state of a data channel for use in transmission of the data.

8. The transmitting apparatus according to claim 7, wherein the one or more processors are operable to adjust the transmission rate on the basis of the transmission quality information that includes at least one of a loss rate, round trip time, jitter, signal-to-noise ratio, and bit error rate of the data.

9. A transmitting method for a transmitting apparatus that transmits data, the transmitting method comprising:
   adjusting a transmission rate of transmitting data, wherein the transmission rate is adjusted such that a rate adjustment ratio of an adjusted transmission rate to an original transmission rate is larger than or equal to a predetermined lower limit;
   changing a size of a buffer for temporarily storing the data, on the basis of the transmission rate;
   causing the buffer to temporarily store the data and to output the data, the data being smaller than or equal to an addable size that is smaller than the size of the buffer; and
   transmitting the data output from the buffer.

10. The transmitting method according to claim 9, further comprising changing the size of the buffer on the basis of a predetermined transmission buffer time, and causing the buffer to output the data within the transmission buffer time from when the data was stored in the buffer.

11. The transmitting method according to claim 9, further comprising restricting the transmission rate from being newly adjusted until a predetermined restriction time passes from when the transmission rate was adjusted.

12. The transmitting method according to claim 11, further comprising restricting the transmission rate from being newly adjusted until the predetermined restriction time passes, the predetermined restriction time indicating a maximum time from when the transmission rate was adjusted to when the size of the data stored in the buffer becomes smaller than or equal to the addable size.

13. The transmitting method according to claim 9, further comprising:
   adjusting an encoding parameter used in generation of encoded data obtained by encoding the data, on the basis of the transmission rate; and
   performing encoding processing based on the encoding parameter on the data based on causing the buffer to temporarily store the encoded data that is smaller than or equal to the addable size and to output the encoded data.

14. The transmitting method according to claim 9, further comprising adjusting a data generation rate serving as the encoding parameter on the basis of the transmission rate, the data generation rate representing an amount of encoded data generated over a predetermined time.

15. The transmitting method according to claim 9, further comprising adjusting the transmission rate on the basis of transmission quality information that represents a state of a data channel for use in transmission of the data.

16. The transmitting method according to claim 9, further comprising adjusting the transmission rate on the basis of the transmission quality information that includes at least one of a loss rate, round trip time, jitter, signal-to-noise ratio, and bit error rate of the data.

17. A non-transitory computer-readable storage medium having stored thereon, a computer program having at least one code section for communication, the at least one code section being executable by a computer for causing the computer to perform steps comprising:

adjusting a transmission rate of transmitting data, wherein the transmission rate is adjusted such that a rate adjustment ratio of an adjusted transmission rate to an original transmission rate is larger than or equal to a predetermined lower limit;

changing a size of a buffer for temporarily storing the data, on the basis of the transmission rate;

transmitting the data output from the buffer; and causing the buffer to temporarily store the data and to output the data for transmission, the data being smaller than or equal to an addable size that is smaller than the size of the buffer.

* * * * *